United States Patent
Cronin et al.

(10) Patent No.: US 11,478,746 B2
(45) Date of Patent: Oct. 25, 2022

(54) METHOD AND SYSTEM FOR TREATING EMISSIONS USING A TRANSIENT PULSED PLASMA

(71) Applicant: TRANSIENT PLASMA SYSTEMS, INC., Torrance, CA (US)

(72) Inventors: Steve Cronin, South Pasadena, CA (US); William P. Schroeder, La Habra Heights, CA (US); Jason M. Sanders, Los Angeles, CA (US); Daniel Singleton, El Segundo, CA (US); Mark Thomas, Redondo Beach, CA (US); Patrick Ford, Redondo Beach, CA (US); Martin Adolph Gundersen, San Gabriel, CA (US)

(73) Assignee: TRANSIENT PLASMA SYSTEMS, INC., Torrance, CA (US)

( * ) Notice: Subject to any disclaimer, the term of this patent is extended or adjusted under 35 U.S.C. 154(b) by 755 days.

(21) Appl. No.: 16/508,069

(22) Filed: Jul. 10, 2019

(65) Prior Publication Data
US 2020/0023308 A1   Jan. 23, 2020

Related U.S. Application Data

(60) Provisional application No. 62/699,475, filed on Jul. 17, 2018.

(51) Int. Cl.
*B01D 53/34*    (2006.01)
*F24C 15/20*    (2006.01)
*B01D 53/76*    (2006.01)

(52) U.S. Cl.
CPC ............ *B01D 53/346* (2013.01); *F24C 15/20* (2013.01); *B01D 53/76* (2013.01); *B01D 2258/0275* (2013.01)

(58) Field of Classification Search
CPC .......... B01D 53/346; B01D 2258/0275; F24C 15/20
USPC ......................................................... 96/234
See application file for complete search history.

(56) References Cited

U.S. PATENT DOCUMENTS

| | | |
|---|---|---|
| 3,660,685 A | 5/1972 | Berger |
| 3,832,568 A | 8/1974 | Wang |
| 4,433,669 A | 2/1984 | Ishikawa et al. |
| 4,677,960 A | 7/1987 | Ward |

(Continued)

FOREIGN PATENT DOCUMENTS

| | | |
|---|---|---|
| CN | 201715597 U | 1/2011 |
| CN | 202524634 U | 11/2012 |

(Continued)

OTHER PUBLICATIONS

KR20100046734A English translation (Year: 2010).*

(Continued)

*Primary Examiner* — Anita Nassiri-Motlagh
(74) *Attorney, Agent, or Firm* — Cozen O'Connor

(57) ABSTRACT

A method and system to treat cooking emissions (e.g., smoke) employs a nanosecond high voltage pulse generator and a transient pulsed plasma reactor. The system is used in a scheme that substantially reduces particulate matter produced in commercial charbroiling processes (e.g., cooking of hamburger meat). Both a reduction in the size distribution and total particulate mass is achieved using the method and system described herein.

25 Claims, 13 Drawing Sheets

(56) References Cited

U.S. PATENT DOCUMENTS

| | | | |
|---|---|---|---|
| 5,157,267 | A | 10/1992 | Shirata et al. |
| 5,563,780 | A | 10/1996 | Goad |
| 6,235,249 | B1 | 5/2001 | Chen |
| 6,317,341 | B1 | 11/2001 | Fraidlin et al. |
| 6,426,666 | B1 | 7/2002 | Li et al. |
| 6,633,017 | B1 | 10/2003 | Drummond et al. |
| 6,831,377 | B2 | 12/2004 | Yampolsky et al. |
| 6,906,280 | B2 | 6/2005 | Rosocha |
| 7,767,433 | B2 | 8/2010 | Kuthi et al. |
| 7,817,396 | B2 | 10/2010 | Tao et al. |
| 7,901,929 | B2 | 3/2011 | Kuthi et al. |
| 7,901,930 | B2 | 3/2011 | Kuthi et al. |
| 8,115,343 | B2 | 2/2012 | Sanders et al. |
| 8,120,207 | B2 | 2/2012 | Sanders et al. |
| 8,212,541 | B2 | 7/2012 | Perreault et al. |
| 8,226,901 | B2 | 7/2012 | Makita et al. |
| 8,418,668 | B2 | 4/2013 | Shimizu |
| 8,854,019 | B1 | 10/2014 | Levesque et al. |
| 8,908,401 | B2 | 12/2014 | Hiltbrunner et al. |
| 9,080,547 | B2 | 7/2015 | Shiraishi et al. |
| 9,617,965 | B2 | 4/2017 | Sanders et al. |
| 9,831,776 | B1 | 11/2017 | Jiang et al. |
| 10,072,629 | B2 | 9/2018 | Sanders et al. |
| 10,128,745 | B2 | 11/2018 | Low et al. |
| 2001/0042372 | A1 | 11/2001 | Khair |
| 2003/0116148 | A1 | 6/2003 | Sakakura |
| 2004/0182832 | A1 | 9/2004 | Rosocha |
| 2005/0218423 | A1 | 10/2005 | Shimizu et al. |
| 2005/0279337 | A1 | 12/2005 | Biljenga |
| 2006/0062074 | A1 | 3/2006 | Gundersen et al. |
| 2007/0031959 | A1 | 2/2007 | Kuthi et al. |
| 2007/0262721 | A1 | 11/2007 | Camilli |
| 2008/0231337 | A1 | 9/2008 | Krishnaswamy et al. |
| 2008/0274632 | A1 | 11/2008 | Lenfert et al. |
| 2009/0126668 | A1 | 5/2009 | Shiraishi et al. |
| 2009/0126684 | A1 | 5/2009 | Shiraishi et al. |
| 2010/0038971 | A1 | 2/2010 | Sanders et al. |
| 2010/0084980 | A1 | 4/2010 | Koo |
| 2010/0156195 | A1 | 6/2010 | Sanders et al. |
| 2011/0069514 | A1 | 3/2011 | Chiba |
| 2011/0267113 | A1 | 11/2011 | Carmon et al. |
| 2012/0039747 | A1 | 2/2012 | Morfill et al. |
| 2013/0318846 | A1 | 12/2013 | Atwood |
| 2014/0109886 | A1 | 4/2014 | Singleton et al. |
| 2014/0230770 | A1 | 8/2014 | Kuthi et al. |
| 2014/0346875 | A1 | 11/2014 | Chinga et al. |
| 2015/0280553 | A1 | 10/2015 | Giuliano et al. |
| 2016/0069320 | A1 | 3/2016 | Idicheria et al. |
| 2016/0254754 | A1 | 9/2016 | Perreault et al. |
| 2018/0269793 | A1 | 9/2018 | Ahsanuzzaman et al. |
| 2019/0032623 | A1 | 1/2019 | Idicheria et al. |
| 2019/0229615 | A1 | 7/2019 | Sanders et al. |
| 2019/0229623 | A1 | 7/2019 | Tsuda et al. |
| 2019/0230779 | A1 | 7/2019 | Sanders et al. |

FOREIGN PATENT DOCUMENTS

| | | |
|---|---|---|
| CN | 105207256 A | 12/2015 |
| CN | 105673139 A | 6/2016 |
| JP | 2005235448 A | 9/2005 |
| JP | 2006081277 A | 3/2006 |
| JP | 2010518555 A | 5/2010 |
| JP | 2012184718 A | 9/2012 |
| JP | 2013144127 A | 7/2013 |
| KR | 10-1995-0003730 | 2/1995 |
| KR | 20100023304 A | 3/2010 |
| KR | 20100046734 A | 5/2010 |
| KR | 101846046 B1 | 4/2018 |
| WO | 2004049769 A1 | 6/2004 |
| WO | 2008055337 A1 | 5/2008 |
| WO | 2010011408 A1 | 1/2010 |
| WO | 2013134573 A1 | 9/2013 |
| WO | 2014066095 A1 | 5/2014 |
| WO | 2015095140 A1 | 6/2015 |
| WO | 2019143992 A1 | 7/2019 |
| WO | 2019144037 A1 | 7/2019 |

OTHER PUBLICATIONS

Extended European Search Report, dated Dec. 18, 2020, for European Application No. 20197970.5, 11 pages.

Lyubutin, S.K., et al., "Repetitive Nanosecond All-Solid-State Pulsers Based on SOS Diodes," Institute of Electrophysics; Russian Academy of Sciences, Ural Division; IEEE 11th International Pulsed Power Conference, Baltimore, MD, 1997, pp. 992-998.

Wang, Fei, et al., "Solid-State High Voltage Nanosecond Pulse Generator," IEEE Pulsed Power Conference, 2005, pp. 1199-1202.

Extended European Search Report for European Application No. 09800737.0 dated Apr. 25, 2014 in 10 pages.

Hewlett Packard. Application Note 918, Pulse and Waveform Generation with Step Recovery Diodes Oct. 1984. 28 pages.

International Search Report and Written Opinion for PCT/US2013/064955 dated Jan. 21, 2014 in 7 pages.

International Search Report and Written Opinion for PCT/US2019/014273 dated May 9, 2019 in 10 pages.

International Search Report and Written Opinion for PCT/US2019/014339 dated May 8, 2019 in 11 pages.

International Search Report for PCT/US2014/070518, dated Mar. 31, 2015, 2 pages.

International Search Report from PCT Application No. PCT/US2009/045073 dated Jan. 28, 2010 in 2 pages.

Kuthi, Andras, U.S. Appl. No. 61/767,044, filed Feb. 20, 2013, "Transient Plasma Electrode for Radical Generation." 7 pages.

Written Opinion for PCT/US2014/070518, dated Mar. 31, 2015, 4 pages.

Babaie, Meisam, et al., "Effect of Pulsed Power on Particle Matter in Diesel Engine Exhaust Using a DBD Plasma Reactor", IEEE Transactions on Plasma Science, vol. 41, No. 8; Aug. 2013, pp. 2349-2358.

Babaie, M., et al., "Influence of non-thermal plasma after-treatment technology on diesel engine particulate matter composition and NOx concentration", Int. J. Environ. Sci. Technol. 2016, vol. 13; pp. 221-230.

Barth, Rolf F., "Rat brain tumor models in experimental neuro-oncology: The 9L, C6, T9, F98, RG2 (D74), RT-2 and CNS-1 Gliomas", Journal of Neuro-Oncology, 1998; vol. 36, pp. 91-102.

Behrend, M.R., et al., "Nanosecond Pulse Generator Using Fast Recovery Diodes for Cell Electromanipulation", IEEE Transactions on Plasma Science, IEEE Service Center, Piscataway, New Jersey; vol. 33, No. 4, Aug. 1, 2005, pp. 1192-1197.

Bier, Martin, et al., "Kinetics of Sealing for Transient Electropores in Isolated Mammalian Skeletal Muscle Cells", Bioelectromagnetics, vol. 20, 1999; pp. 194-201.

Borner, Markus M., et al., "The detergent Triton X-100 induces a death pattern in human carcinoma cell lines that resembles cytotoxic lymphocyte-induced apoptosis", FEBS Letters (1994), vol. 353, pp. 129-132.

Chae, J.-O., "Non-thermal plasma for diesel exhaust treatment", Journal of Electrostatics, Slesvier Science B.V., vol. 57, 2003, pp. 251-262.

Chang, J.S., "Physics and chemistry of plasma pollution control technology", Plasma Sources Science and Technology; IOP Publishing, vol. 17, 2008; pp. 1-6.

Chow, Judith C., et al., "Health Effects of Fine Particulate Air Pollution: Lines that Connect", Journal of the Air & Waste Management Association, 2006; vol. 56, No. 10, pp. 1368-1380.

Cole, M.J., et al., "Time-domain whole-field fluorescence lifetime imaging with optical sectioning", Journal of Microscopy, vol. 203, Pt 3, Sep. 2001, pp. 246-257.

Cossarizza, Andrea, et al., "Chapter 21: Analysis of Mitochondria during Cell Death", Methods in Cell Biology, vol. 63, 2001; pp. 467-486.

Craft, Cheryl M., et al., "PhLPs and PhLOPs in the Phosducin Family of G beta gamma Binding Proteins", Biochemistry, American Chemical Society, 1998; vol. 37, pp. 15758-15772.

(56) References Cited

OTHER PUBLICATIONS

Cubeddu, R., et al., "Time-resolved fluorescence imaging in biology and medicine", Topical Review; Institute of Physics Publishing, Journal of Physics D: Applied Physics; vol. 35, 2002; pp. R61-R76.
Deangelis, Lisa M., "Brain Tumors", New England Journal of Medicine, Jan. 11, 2001; vol. 344, No. 2, pp. 114-123.
Debruin, Katherine A., et al., "Modeling Electroporation in a Single Cell. I. Effects of Field Strength and Rest Potential", Biophysical Journal, Sep. 1999; vol. 77, pp. 1213-1224.
Dockery, Douglas W., et al., "An Association Between Air Pollution and Mortality in Six U.S. Cities", The New England Journal of Medicine; Dec. 9, 1993; vol. 329, No. 24, pp. 1753-1759.
Frank, K., et al., "High-Power Pseudospark and BLT Switches", IEEE Transactions on Plasma Science, European Organization for Nuclear Research, Apr. 1988; vol. 16, No. 2, pp. 317-323.
Freeman, Scott A., et al., "Theory of Electroporation of Planar Bilayer Membranes: Predictions of the Aqueous Area, Change in Capacitance, and Pore-Pore Separation", Biophysical Journal, Jul. 1994; vol. 67, pp. 42-56.
Garon, E.B., et al., 2007 In Vitro and In Vivo Evaluation and a Case Report of Intense Nanosecond Pulsed Electric Field as a Local Therapy for Human Malignancies. Int. J. Cancer, vol. 121: pp. 675-682.
Gotoh, Tomomi, et al., "Nitric Oxide-induced Apoptosis in RAW 264.7 Macrophages Is Mediated by Endoplasmic Reticulum Stress Pathway Involving ATF6 and CHOP", The Journal of Biological Chemistry, The American Society for Biochemistry and Molecular Biology, Inc.; 2002; vol. 277, No. 14, pp. 12343-12350.
Grekhov, I.V., et al., "Formation of nanosecond high-voltage drops across semiconductor diodes with voltage recovery by a drift mechanism", Sov. Tech. Phys. Lett., 1983; vol. 9, No. 4, pp. 188-189.
Grekhov, I.V., et al., "Nanosecond semiconductor diodes for pulsed power switching", Physics-Uspekhi, Russian Academy of Sciences, 2005; vol. 48, No. 7; pp. 703-712.
Grekhov, Igor V., et al., "Physical Basis for High-Power Semiconductor Nanosecond Opening Switches", IEEE Transactions on Plasma Science, Oct. 2000; vol. 28, No. 5, pp. 1540-1544.
Gundersen, M., et al., "Nanosecond Pulse Generator Using a Fast Recovery Diode", IEEE 26th Power Modulator Conference, 2004; pp. 603-606.
Gysel, Nicholas, et al., "Particulate matter emissions and gaseous air toxic pollutants from commercial meat cooking operations", Journal of Environmental Sciences; The Research Center for Eco-Environmental Sciences, Chinese Academy of Sciences; vol. 65, 2018, pp. 162-170.
Hackam, R., et al., "Air Pollution Control by Electrical Discharges", IEEE Transactions on Dielectrics and Electrical Insulation, vol. 7, No. 5, Oct. 2000, pp. 654-683.
Hemker, R.G., et al., "Development of a Parallel Code for Modeling Plasma Based Accelerators", Proceedings of the 1999 Particle Accelerator Conference, New York, 1999; pp. 3672-3674.
Joshi, R.P., et al., "Electroporation Dynamics in Biological Cells Subjected to Ultrafast Electrical Pulses: A Numerical Simulation Study", Physical Review E, vol. 62, No. 1; Jul. 2000; pp. 1025-1033.
Kaltsonoudis, Christos, et al., "Characterization of fresh and aged organic aerosol emissions from meat charbroiling", Atmospheric Chemistry and Physics, vol. 17, 2017; pp. 7143-7155.
Kirkman, George F., et al., "Low pressure, light initiated, glow discharge switch for high power applications", Appl. Phys. Lett.; American Institute of Physics, 1986; vol. 49, pp. 494-495.
Kotnik, Tadej, et al., "Theoretical Evaluation of the Distributed Power Dissipation in Biological Cells Exposed to Electric Fields", Bioelectromagnetics, vol. 21; 2000; pp. 385-394.
Kotov, Yu A., et al., "Novel nanosecond semiconductor opening switch for megavolt repetitive pulsed power technology: experiment and applications", In Proceedings of the 9th Int. IEEE Pulsed Power Conference, Albuquerque, NM, 1993; SPIE vol. 2374; pp. 98-103.

Kuroki, Tomoyuki, et al., "Single-Stage Plasma-Chemical Process for Particulates, Nox, and SOx Simultaneous Removal", IEEE Transactions on Industry Applications, vol. 38, No. 5, Sep./Oct. 2002, pp. 1204-1209.
Kuthi, A., et al., "Nanosecond pulse generator using a fast recovery diode", Power Modulator Symposium, 2004 and 2004 High-Voltage Workshop. Conference Record of the 26th International San Francisco, CA May 23-26, 2004 IEEE, pp. 603-606.
Lee, Jun-Bok, et al., "Emission Rate of Particulate Matter and Its Removal Efficiency by Precipitators in Under-Fired Charbroiling Restaurants", TheScientificWorldJOURNAL, TSW Environment; 2011, vol. 11, pp. 1077-1088.
Li, Aimin, et al., "Gene Expression Networks Underlying Retinoic Acid-Induced Differentiation of Human Retinoblastoma Cells", Investigative Ophthalmology & Visual Science, Mar. 2003; vol. 44, No. 3, pp. 996-1007.
Li, Aimin, et al., "Retinoic Acid Upregulates Cone Arrestin Expression in Retinoblastoma Cells through a Cis Element in the Distal Promoter Region", Investigative Ophthalmology & Visual Science, May 2002; vol. 43, No. 5, pp. 1375-1383.
Lyubutin, S.K., et al., "Repetitive Nanosecond All-Solid-State Pulsers Based on SOS Diodes", Institute of Electrophysics; Russian Academy of Sciences, Ural Division; IEEE 11th International Pulsed Power Conference, Baltimore, MD; pp. 992-998.
Marcu, Laura, et al., "Photobleaching of Arterial Fluorescent Compounds: Characterization of Elastin, Collagen and Cholesterol Time-resolved Spectra during Prolonged Ultraviolet Irradiation", Photochemistry and Photobiology, 1999; vol. 69, No. 6, pp. 713-721.
Marszalek, Piotr, et al., "Schwan equation and transmembrane potential induced by alternating electric field", Biophysical Journal, Oct. 1990; vol. 58, pp. 1053-1058.
Matsumoto, Takao, et al., "Energy Efficiency Improvement of Nitric Oxide Treatment Using Nanosecond Pulsed Discharge", IEEE Transactions on Plasma Science; vol. 38, No. 10, Oct. 2010; pp. 2639-2643.
International Search Report and Written Opinion for PCT/US2019/041228, dated Nov. 12, 2019, 10 pages.
Gilbert, Richard A., "Novel Electrode Designs for Electrochemotherapy", Biochimica et Biophysica Acta 1334, 1997, pp. 9-14.
Extended European Search Report.
Huiskamp, T., et al., "Matching a Nanosecond Pulse Source to a Streamer Corona Plasma Reactor With a DC Bias", IEEE Transactions on Plasma Science, vol. 43, No. 2, Feb. 1, 2015, 617-624.
Matsumoto, Takao, et al., "Process Performances of 2 ns Pulsed Discharge Plasma", Japanese Journal of Applied Physics voi. 5, No. 8, Aug. 1, 2011.
Mohapatro, Sankarsan, et al., "Nanosecond pulse discharge based nitrogen oxides treatment using different electrode configurations", The Institution of Engineering and Technology, vol. 2, No. s 2, Jun. 1, 2017, 60-68.
Yamashita, H., et al., "Characteristics of negative-polarity DC superimposed nanosecond discharge and its applications", 2019 IEEE Pulsed Power & Plasma Sciences (PPPS), Jun. 23, 2019, 1-4.
Extended European Search Report, dated Sep. 20, 2021, for European Application No. 19741949.2-1211, 5 pages.
International Search Report & Written Opinion for PCT/US2020/030540, dated Aug. 12, 2020, 12 pages.
Extended European Search Report dated Jul. 16, 2021 for corresponding EP Application No. 19838770.6, 27 pages.
Maytin, Edward V., et al., "Stress-Inducible Transcription Factor CHOP/gadd153 Induces Apoptosis in Mammalian Cells via p38 Kinase-Dependent and -Independent Mechanisms", Experimental Cell Research, 2001; vol. 267, pp. 193-204.
Mcdonald, Jacob D., et al., "Emissions from Charbroiling and Grilling of Chicken and Beef", Journal of the Air & Waste Management Association, 2003; vol. 53, No. 2, pp. 185-194.
Moll, John L., et al., "Physical Modeling of the Step Recovery Diode for Pulse and Harmonic Generation Circuits", Proceedings of the IEEE, Jul. 1969; vol. 57, No. 7, pp. 1250-1259.

(56) References Cited

OTHER PUBLICATIONS

Oberdorster, Gunter, et al., "Nanotoxicology: An Emerging Discipline Evolving from Studies of Ultrafine Particles", Environmental Health Perspectives, vol. 113, No. 7; Jul. 2005; pp. 823-839.

Perryman, Pamela, "Preliminary Draft Staff Report: Proposed Amended Rule 1138—Control of Emissions from Restaurant Operations", South Coast Air Quality Management District; Planning, Rule Development, and Area Sources, Aug. 2009, in 27 pages.

Pogue, Brian W., et al., "In Vivo NADH Fluorescence Monitoring as an Assay for Cellular Damage in Photodynamic Therapy", Photochemistry and Photobiology, 2001; vol. 74, No. 6, pp. 817-824.

Polevaya, Yulia, et al., "Time domain dielectric spectroscopy study of human cells II. Normal and malignant white blood cells", Biochimica et Biophysica Acta, 1999; vol. 1419, pp. 257-271.

Pope III, C. Arden, et al., "Lung Cancer, Cardiopulmonary Mortality, and Long-term Exposure to Fine Particulate Air Pollution", JAMA, Mar. 6, 2002; vol. 287, No. 9, pp. 1132-1141.

Rajanikanth, B.S., et al., "Discharge Plasma Treatment for NOx Reduction from Diesel Engine Exhaust: A Laboratory Investigation", IEEE Transactions on Dielectrics and Electrical Insulation, vol. 12, No. 1; Feb. 2005, pp. 72-80.

Rukin, S.N., "High-Power Nanosecond Pulse Generators Based on Semiconductor Opening Switches (Review)", Instruments and Experimental Techniques, 1999; vol. 42, No. 4, pp. 439-467.

Samet, Jonathan M., et al., "Fine Particulate Air Pollution and Mortality in 20 U.S. Cities, 1987-1994", The New England Journal of Medicine, Massachusetts Medical Society; Dec. 14, 2000; vol. 343, No. 24, pp. 1742-1749.

Sanders, J., et al., "Broadband Power Measurement of High-Voltage, Nanosecond Electric Pulses for Biomedical Applications", IEEE International Power Modulator Conference, Las Vegas, NV, 2008; pp. 350-353.

Schoenbach, Karl H., et al., "The Effect of Pulsed Electric Fields on Biological Cells: Experiments and Applications", IEEE Transactions on Plasma Science, Apr. 1997; vol. 25, No. 2, pp. 284-292.

Tang, Tao, et al., "Diode Opening Switch Based Nanosecond High Voltage Pulse Generators for Biological and Medical Applications", IEEE Transactions on Dielectrics and Electrical Insulation, Aug. 2007; vol. 14, No. 4; pp. 878-883.

Wakita, Masayoshi, et al., "Some Characteristics of the Fluorescence Lifetime of Reduced Pyridine Nucleotides in Isolated Mitochondria, Isolated Hepatocytes, and Perfused Rat Liver In Situ", J. Biochem., 1995; vol. 118, No. 6, pp. 1151-1160.

Wang, Fei, et al., "Solid-State High Voltage Nanosecond Pulse Generator", IEEE Pulsed Power Conference, Abstract Number #10123, pp. 1199-1202.

Watanabe, Kenji, et al., "Feasibility and limitations of the rat model by C6 gliomas implanted at the subcutaneous region", Neurological Research; Jul. 2002, vol. 24, No. 5; pp. 485-490.

Weaver, James C., et al., "Theory of electroporation: A review", Bioelectrochemistry and Bioenergetics, 1996; vol. 41, pp. 135-160.

Webb, S.E.D., et al., "A wide-field time-domain fluorescence lifetime imaging microscope with optical sectioning", Review of Scientific Instruments, Apr. 2002; vol. 73, No. 4, pp. 1898-1907.

Weiss, Arthur, et al., "The role of T3 surface molecules in the activation of human t cells: a two-stimulus requirement for IL 2 production reflects events occurring at a pre-translational level", The Journal of Immunology, vol. 133, No. 1; Jul. 1984, pp. 123-128.

Yancey, J.W.S., et al., "Cookery method and endpoint temperature can affect the Warner-Bratzler shear force, cooking loss, and internal cooked color of beef semimembranosus and infraspinatus steaks", J. Anim. Sci. 2016, vol. 94, pp. 4434-4446.

Zhu, Xuemei, et al., "Mouse cone arrestin gene characterization: promoter targets expression to cone photoreceptors", FEBS Letters, 2002; vol. 524, pp. 116-122.

Zhu, Xuemei, et al., "The Carboxyl Terminal Domain of Phosducin Functions as a Transcriptional Activator", Biochemical and Biophysical Research Communications, 2000; vol. 270, pp. 504-509.

\* cited by examiner

METHOD AND SYSTEM FOR TREATING EMISSIONS USING A TRANSIENT PULSED PLASMA

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This description relates to systems and methods that employ high voltage, high power nanosecond pulses in treating cooking smoke.

BACKGROUND

Smoke emissions from chain-driven (i.e., conveyor-belt) charbroilers has been regulated by the air quality management district (SC-AQMD) in southern California since 1997 (see RULE 1138). This "smoke" consists of oil particles (particulate matter) typically around 150 nm in diameter. This problem has been "solved" using high temperature catalysts that cost $1500-$2000, are stable for more than 10 years, and are nearly maintenance-free. These catalyst-based systems make use of the high temperatures within a few inches of the cooking surface. However, these relatively large chain-driven charbroilers are only found in large fast food restaurants and comprise a relatively small fraction of total restaurant smoke emissions.

Open-underfire broilers (the kind most people are familiar with) are found in thousands of restaurants in the southern California area alone. These emissions are currently not regulated but account for 85% of all restaurant emissions in the South Coast region of California. Typical mass flow rates for these charbroilers are around 10 lbs/day or volumetric flow rates of 1600 $ft^3$/min and higher. This corresponds to approximately 5 grams of particulate matter (PM) per hamburger. The same high temperature catalysts used for the chain-driven broilers are not applicable here, because the exhaust is cold by the time it reaches the hood approximately 1 m away.

SUMMARY

The present disclosure is directed toward a system and method to remove and reduce particulate matter from commercial charbroiling processes. This is achieved by means of treating the smoke produced by the charbroiling process as it flows through the exhaust system and into a Transient Plasma Emission Remediation (TPER) Reactor, where it is treated with a non-equilibrated transient plasma that is generated by high voltage electrical pulses, each with a duration of nanoseconds.

In particular, a method and system for treating cooking smoke emissions, for example emissions from cooking appliances (e.g., charbroilers, broilers, grills, stove, ovens and other kitchen or restaurant equipment), includes an exhaust pathway (e.g., vent, duct), a TPER reactor positioned to treat an exhaust stream of cooking smoke vented via the exhaust pathway, and a nanosecond high voltage pulse generator coupled to drive the transient pulsed plasma reactor. The system substantially reduces particulate matter produced in cooking, for example in commercial charbroiling processes (e.g., cooking/grilling of hamburger meat). Both a reduction in the size distribution and total particulate mass is advantageously achieved using the methods and systems described herein.

The system may optionally include a DC voltage source to supplement the TPER reactor. In particular, a DC voltage may be connected to a center conductor of a TPER reactor. In this configuration, the high voltage nanosecond pulses are coupled onto the center conductor of the TPER reactor and are superimposed on top of the DC voltage. This may be done either to produce a static electric field that lowers the electric field required to be generated by the high voltage, nanosecond duration pulse that is required to strike a non-equilibrated transient plasma. The DC voltage may also be used to produce a static electric field that behaves like an electrostatic precipitator (ESP) and serves to precipitate particulate matter out of the gas flow.

The foregoing summary does not encompass the claimed subject matter in its entirety, nor are the embodiments intended to be limiting. Rather, the embodiments are provided as mere examples.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with food preparation devices such as ovens, skillets, and other similar devices, closed-loop controllers used to control cooking conditions, food preparation techniques, wired and wireless communications protocols, geolocation, and optimized route mapping algorithms have not been shown or described in detail to avoid unnecessarily obscuring descriptions of the embodiments. In other instances, certain structures associated with conveyors and/or robots are have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
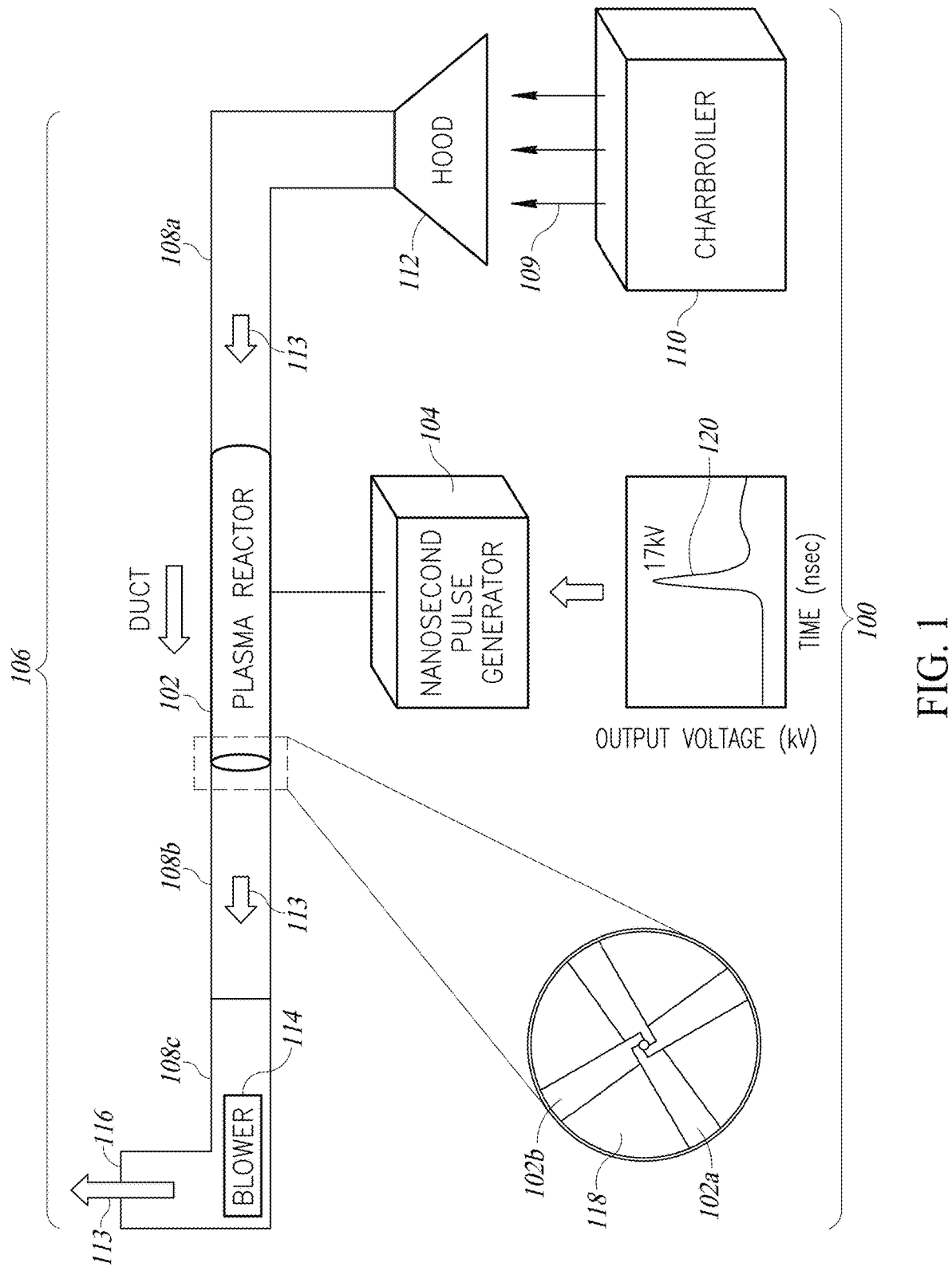
FIG. 1 is a schematic diagram showing a system to treat cooking emissions according to at least one illustrated implementation, the system including a kitchen ventilation system including a charbroiler, hood, duct, and blower, and the system also including a Transient Plasma Emission Remediation (TPER) reactor installed in a flow path of the kitchen ventilation system, and a nanosecond pulse generator coupled to drive the TPER reactor.

FIG. 1 shows a system 100 to treat cooking smoke emissions using a transient pulsed plasma, according to one illustrated implementation.

The system 100 includes a Transient Plasma Emission Remediation (TPER) reactor 102 and a nanosecond pulse generator 104 coupled to drive that TPER reactor 102. The TPER reactor 102 is designed to connect to an exhaust system 106, for example in series with one or more ducts 108a, 108b, 108c (three shown, collectively 108) that are part of the exhaust system 106 that vents the cooking emissions (e.g., smoke) 109 generated by a cooking appliance 110 (e.g., charbroiler) out of a building and into the atmosphere. The exhaust system 106 may include one or more hoods 112 positioned relatively above the cooking appliance 110 to capture the cooking emissions (e.g., smoke) 109 produced by the cooking process. The hood 112 can take a variety of forms. The hood 112 will typically comprise a stainless steel sheet metal enclosure with a relative large hood input vent at one end, and a relatively smaller hood output vent at another end. The exhaust system 106 may include one or more blowers (e.g., fans) 114 positioned to draw and, or push the cooking emissions (e.g., smoke) 109 through the duct(s) 108 from the hood 112 to an exhaust outlet vent 116. The hood 112 and the ducts 108 define a fluid flow path (represented by arrows) 113 to constrain and guide passage of the capture the cooking emissions (e.g., smoke) 109.

In one embodiment, the TPER reactor 102 for particulate matter remediation is comprised of a stainless steel cylindrical reactor anode 102a with a coaxial electrode 102b. This coaxial TPER reactor 102 comprises a thin wire, between 0.001 inch and 1 inch in diameter that is centered inside of an electrically conductive tube with an inner diameter between 1 inch and 24 inches, where the inner diameter is determined by the maximum voltage of the nanosecond pulse generator 104 that is driving the plasma generating reactor 102. An impedance of TPER reactor 102 is matched with a source cable 126 in order to reduce voltage reflections. The TPER reactor 102 provides a corona discharge in a coaxial cell geometry.

FIG. 1 also shows the resulting transient plasma (i.e., high electron energy, low-temperature plasma) 118, as well as the shape of a typical high voltage pulse 120 produced by the nanosecond pulse generator and supplied to the TPER reactor 102. The plasma 118 is generated inside the TPER reactor 102 by driving a high voltage, nanosecond duration electrical pulse 120 onto the center conductor 102a or conductors of the TPER reactor(s) 102. In some implementations, the nanosecond duration electrical pulse 120 may have a duration of approximately equal to or less than 100 ns and may have a magnitude of approximately equal to or greater than >1 kV. For instance, suitable values for the nanosecond duration electrical pulse 120 may be a duration in a range of 0.1 ns to 100 ns, inclusive, and a magnitude in a range of 1 kV to 100 kV, inclusive.

In another implementation, a 4-electrode geometry is utilized for the plasma generating reactor 102, where the diameter of the wire generating the plasma and the outer tube are sized similarly to the ones described for the single wire geometry.

The system 100 may take the form of a retro-fit system, for example sized and dimensioned or shaped to be installed as part of a previously installed exhaust system that draws smoke from a vicinity of a cooking appliance and venting such into the atmosphere, typically with one or more filters. The retro-fit system may allow for the removal of one or more filters, for example including a replacement section or piece of duct to replace a section in which filters are mounted, or to provide a bypass fluid path around pre-existing filters or pre-existing filter section. In some implementations, one or more TPER reactors 102 could be installed on a roof of a building, for example connected in series with existing exhaust ducts.

Figure 2:
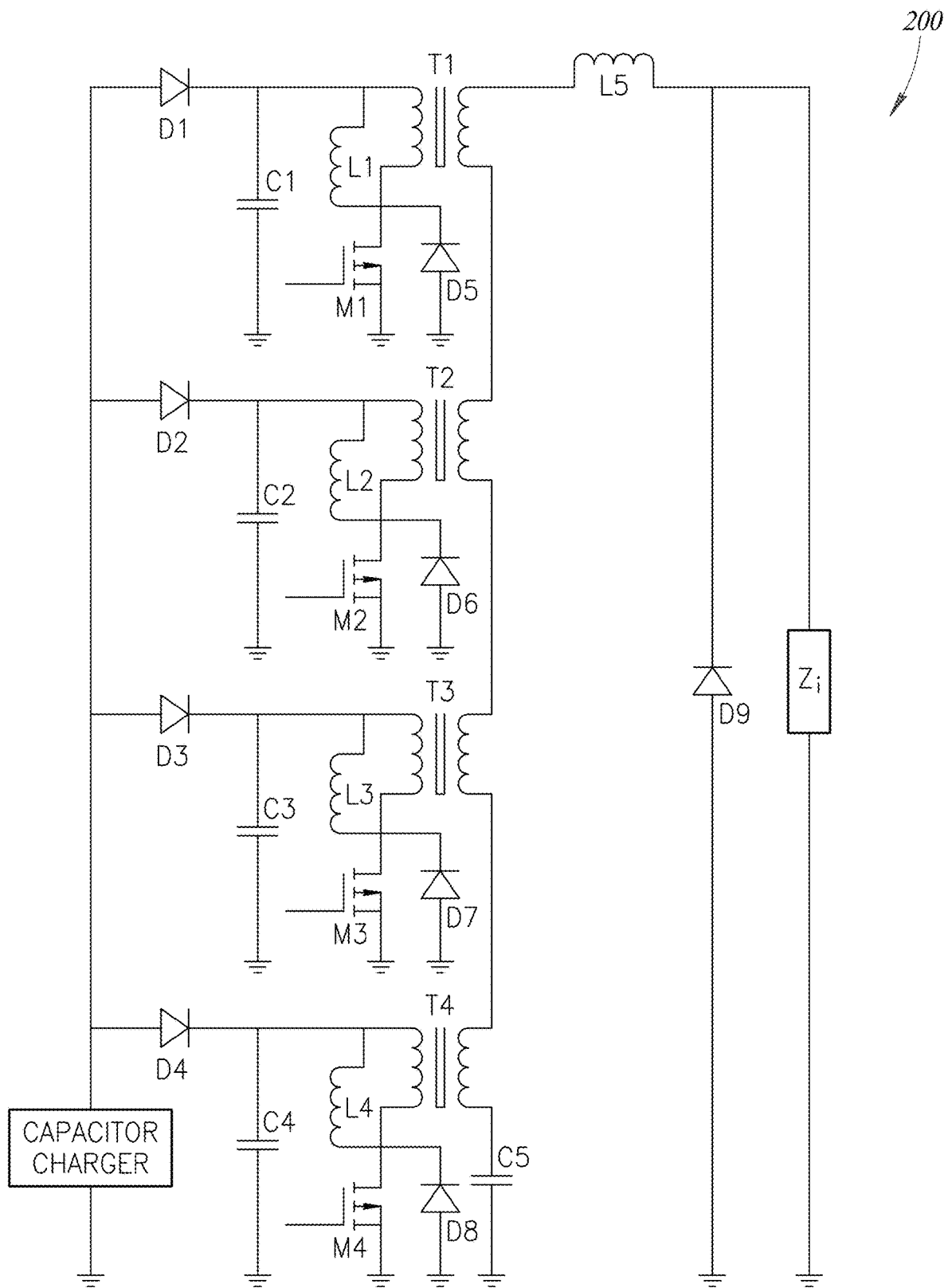
FIG. 2 is a circuit diagram showing a circuit suitable for inclusion in the a nanosecond pulse generator of FIG. 1, according to at least one illustrated implementation, the illustrated circuit operable to generate the high voltage, nanosecond duration electrical pulses to generate plasma in the TPER reactor.

FIG. 2 shows a circuit 200 that is operable to generate a high voltage pulse to drive a TPER reactor 102, for example the TPER reactor 102 illustrated in FIG. 1. A series of inductively coupled switching stages 202a, 202b, 202c, 202d (only four shown, collectively 202) discharge capacitors C1, C2, C3, C4 in series to achieve voltage multiplication. Operating switches M1, M2, M3, M4 causes energy to flow from these capacitors C1, C2, C3, C4 to energize a drift step recovery diode D9, which rapidly interrupts energy stored by a charge circuit inductor L5 to produce a high power, high voltage electrical pulse, which is transmitted to the anode or anodes of the TPER reactor 102.

Figure 3:
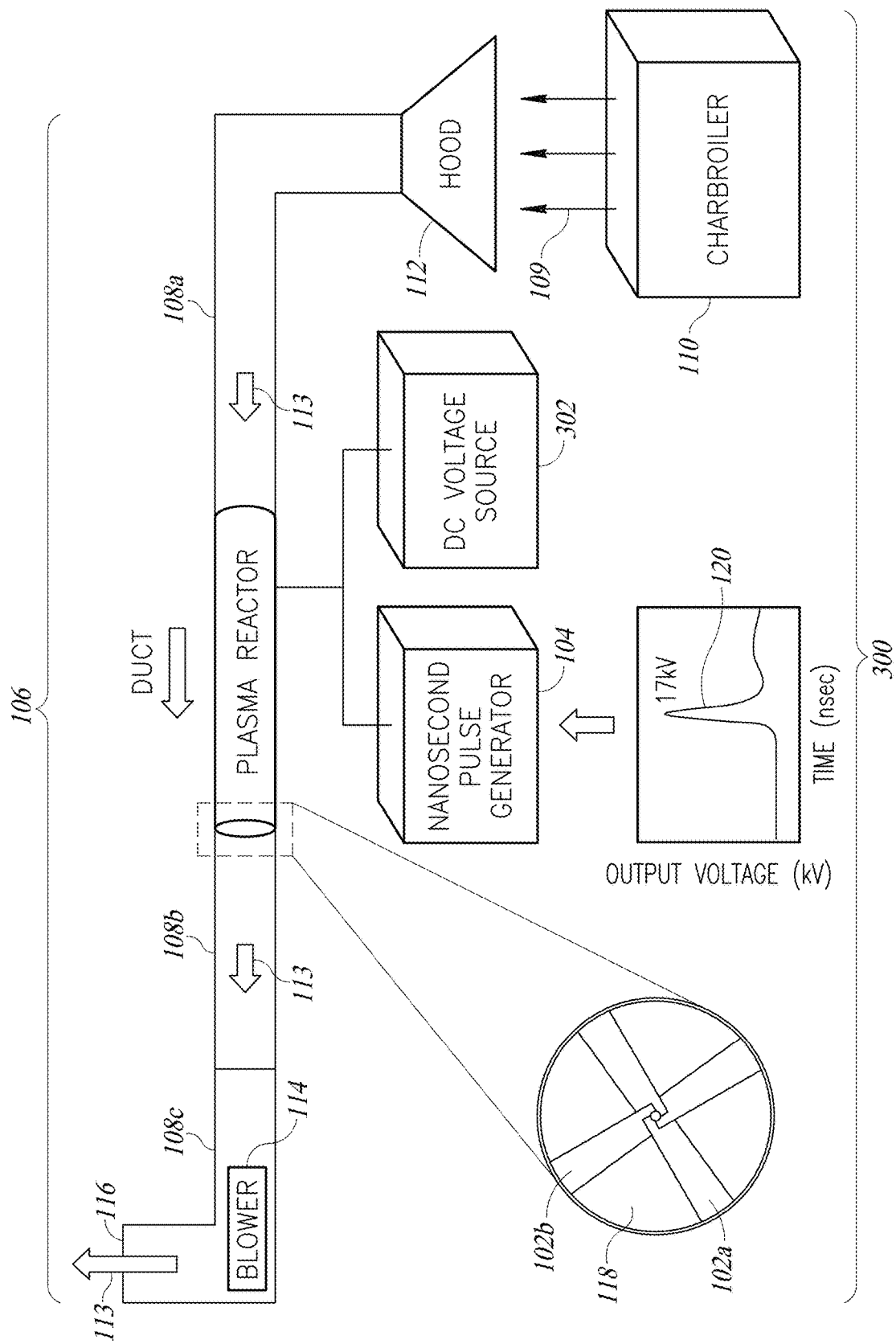
FIG. 3 is a schematic diagram showing a system to treat cooking emissions according to at least another illustrated implementation, the system including a kitchen ventilation system including a charbroiler, hood, duct, and blower, and the system also including a Transient Plasma Emission Remediation (TPER) reactor installed in a flow path of the kitchen ventilation system, and a DC bias voltage in addition to a nanosecond pulse generator coupled to drive the TPER reactor.

FIG. 3 shows a system 300 to treat cooking smoke emissions using a transient pulsed plasma, according to another illustrated implementation. The system 300 is similar to the system 100 (FIG. 1), and similar or even identical structures are identified in FIG. 3 with the same reference numbers as employed in FIG. 1. In the interest of conciseness, only significant differences are discussed below.

In the system 300, a DC voltage source 302 may also be connected to the TPER reactor 102, in addition to the high voltage nanosecond pulse generator (e.g., power supply) 104. In this implementation, the nanosecond duration pulses 120 are coupled onto the anode or anodes of the TPER reactor 102, which is biased to a set DC voltage via the DC voltage source 302. The voltage of the nanosecond duration pulses 120 adds to the DC voltage.

Figure 4:
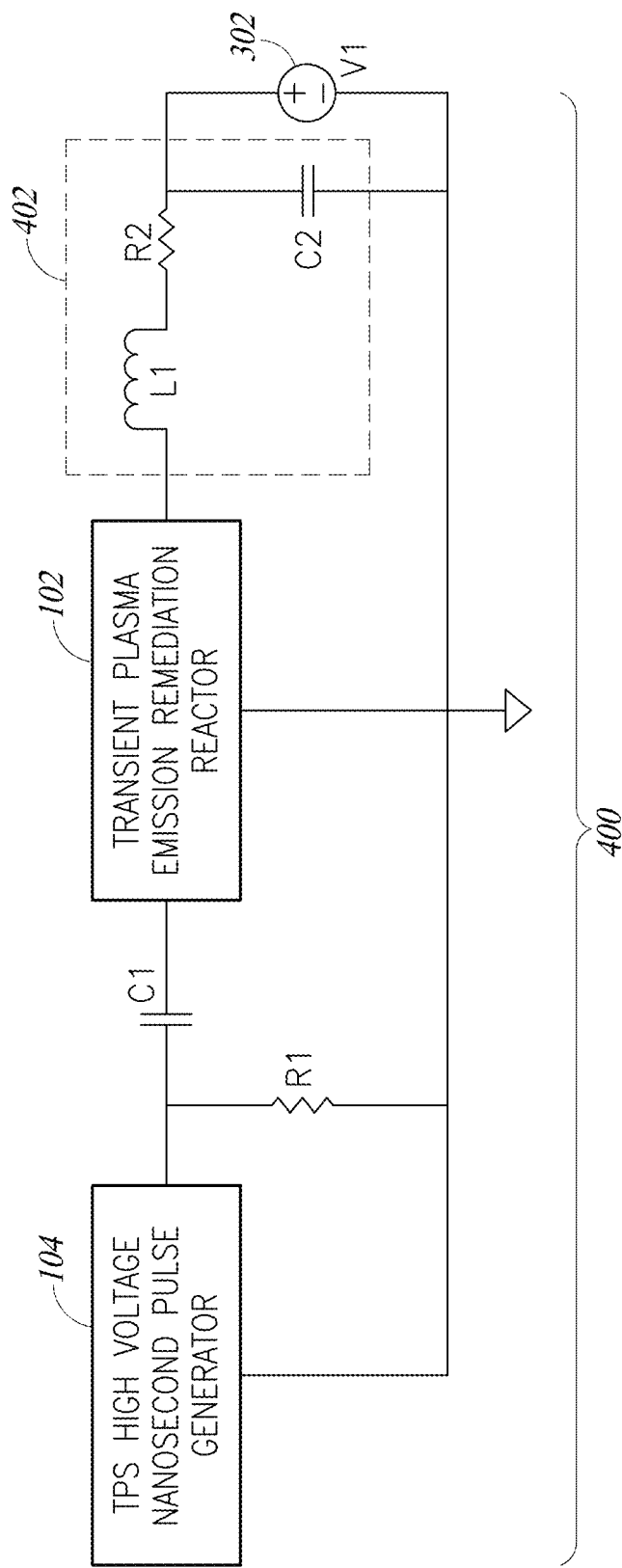
FIG. 4 is a circuit diagram showing both a DC voltage supply and the high voltage nanosecond supply coupled to drive the TPER reactor of FIG. 3.

FIG. 4 shows a portion of a system 400 to treat cooking smoke emissions using a transient pulsed plasma, according to one illustrated implementation. In this implementation, the nanosecond pulses 120 (FIGS. 1 and 3) are capacitively coupled onto the anode or anodes 102a (FIGS. 1 and 3) of the TPER reactor 102 through a DC coupling capacitor $C_1$. A low pass filter (illustrated enclosed in broken-line box) 402 is used to isolate the DC supply (e.g., DC voltage source 302) from the high voltage, nanosecond duration pulse generator 104.

In particular, the system shows one implementation of how a DC voltage source 302 and a high voltage, nanosecond duration pulse generator (e.g., power supply) 104 may be connected to a TPER reactor 102. Both the DC voltage source 302 and the high voltage, nanosecond duration pulse generator 104 are electrically coupled to the anode or anodes of the TPER reactor 102. The DC voltage source 302 is electrically isolated from the high voltage, nanosecond pulse generator 104 by a low pass filter, comprised of inductor $L_1$, resistor $R_2$, and capacitor $C_2$. The high voltage, nanosecond pulse generator 104 is electrically isolated from the DC voltage source 302 by a coupling capacitor $C_1$. A resistor $R_1$ provides a DC path to allow the DC voltage source 302 to fully charge the coupling capacitor $C_1$. The values of coupling capacitor $C_1$, inductor $L_1$, and capacitor $C_2$ are determined by the desired or defined pulse parameters of the high voltage, nanosecond pulse generator 104. Capacitor $C_1$ and capacitor $C_2$ are chosen to provide low impedance to the nanosecond duration pulse; whereas, inductor $L_1$ is chosen to appear as a high impedance. The value of resistor $R_1$ is chosen to be sufficiently large so as to avoid excessive heating when the high voltage nanosecond pulse generator 104 is running at maximum or rated power. Resistor $R_2$ is chosen to sufficiently damp the resonance of inductor $L_1$, coupling capacitor $C_1$, and capacitor $C_2$.

A proof-of-principle experiment of this method and system has been performed in which a TPER reactor based system was tested in a test kitchen facility. Two TREP reactors were installed in parallel to a kitchen ventilation system including a charbroiler, hood, duct, and blower. Only a fraction of the full flow was passed through the TPER reactors.

Figure 5:
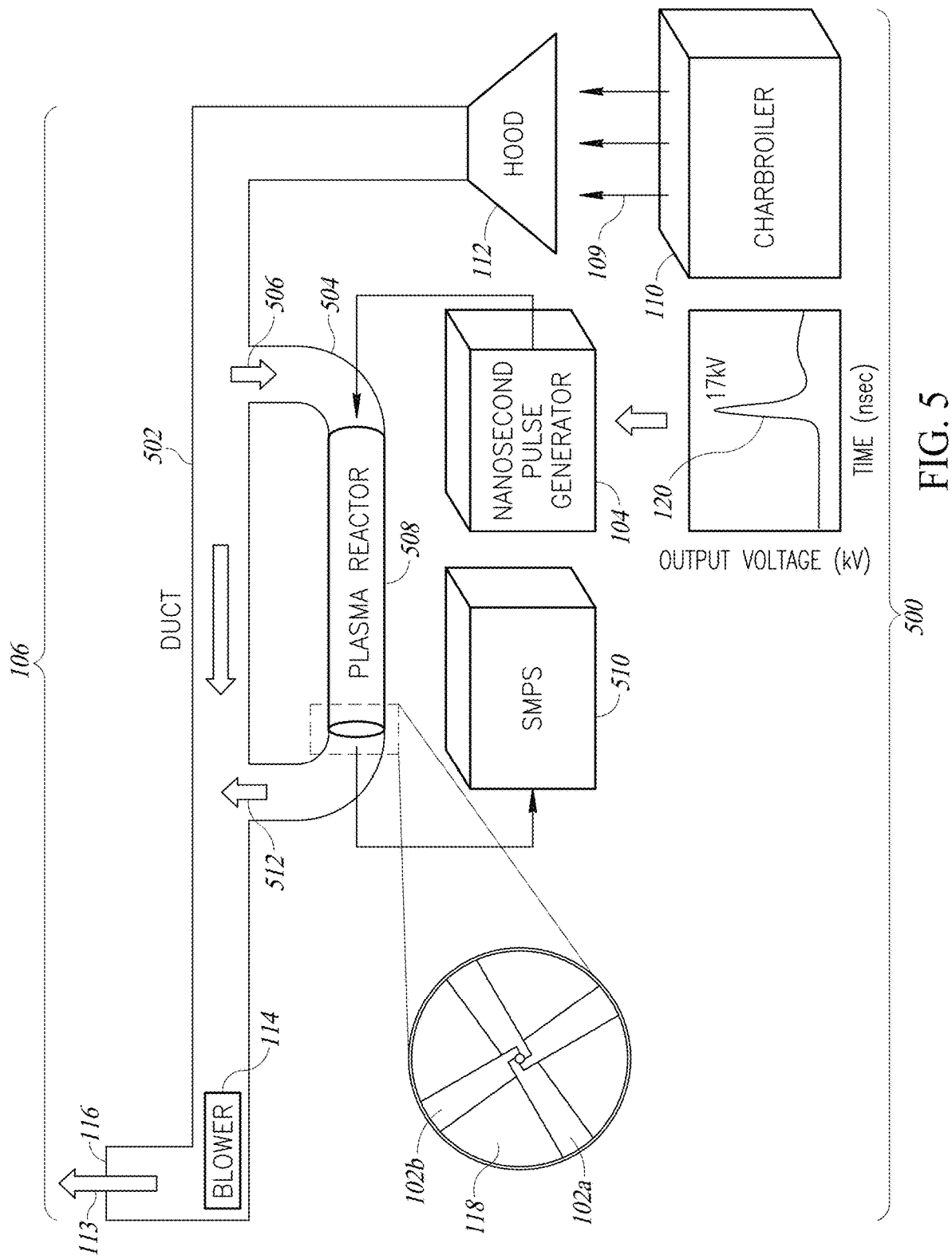
FIG. 5 is a schematic diagram of an experimental setup used to test a TPER reactor and nanosecond pulse generator.

FIG. 5 shows a system 500 used to perform the experiment referred to immediately above. The system 500 is similar to the system 100 (FIG. 1), and similar or even identical structures are identified in FIG. 5 with the same reference numbers as employed in FIG. 1. In the interest of conciseness, only significant differences are discussed below.

In contrast to the system 100 (FIG. 1), the system 500 includes a main duct 502 and a tap duct 504. The tap duct 504 is used to tap or exhaust a slip stream of the smoke exhaust 506 from the main duct 502 and treated the slip stream of the smoke exhaust 506 by a pair of TPER reactors 508. The TPER reactors 508 comprise two 3" diameter TPER reactors, each 3 feet in length, and arranged in parallel with one another. Each TPER reactor 508 was powered by a nanosecond pulse generator 104, in particular a TPS Model 20X nanosecond pulse generator. The system 500 includes a spectrometer 510. The treated smoke exhaust 512 returns to the main duct 502 after being subjected to the non-equilibrated transient plasma.

In particular, particle distributions were collected using a Scanning Mobility Particle Sizer (SMPS) spectrometer (TSI Model 3776) over the range from 14-650 nm. Hamburgers (75% lean, 25% fat) were cooked for 4.5 minutes per side continuously for 3 hours during this study, as shown in FIG. 3. 15 patties were cooked at a time on a grill that was 25×30" in area. A total of 375 patties were cooked during this study. The cooking emissions (e.g., smoke) 109 collected by the hood 112 was then treated with the TPER reactors.

Figure 6A:
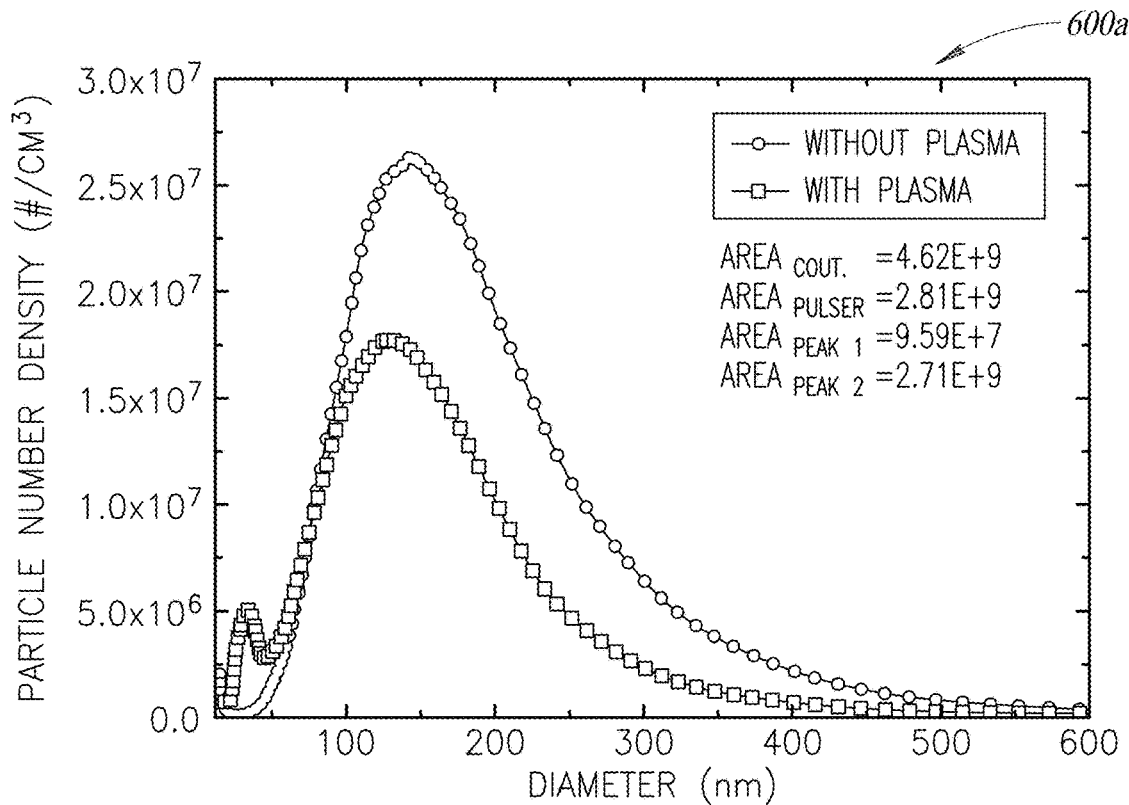
FIG. 6A is a graph that shows plots of a set of particle number densities versus particle size measured (using an SMPS) with and without the plasma treatment for a flow conditions of 2.5 m/s.
Figure 6B:
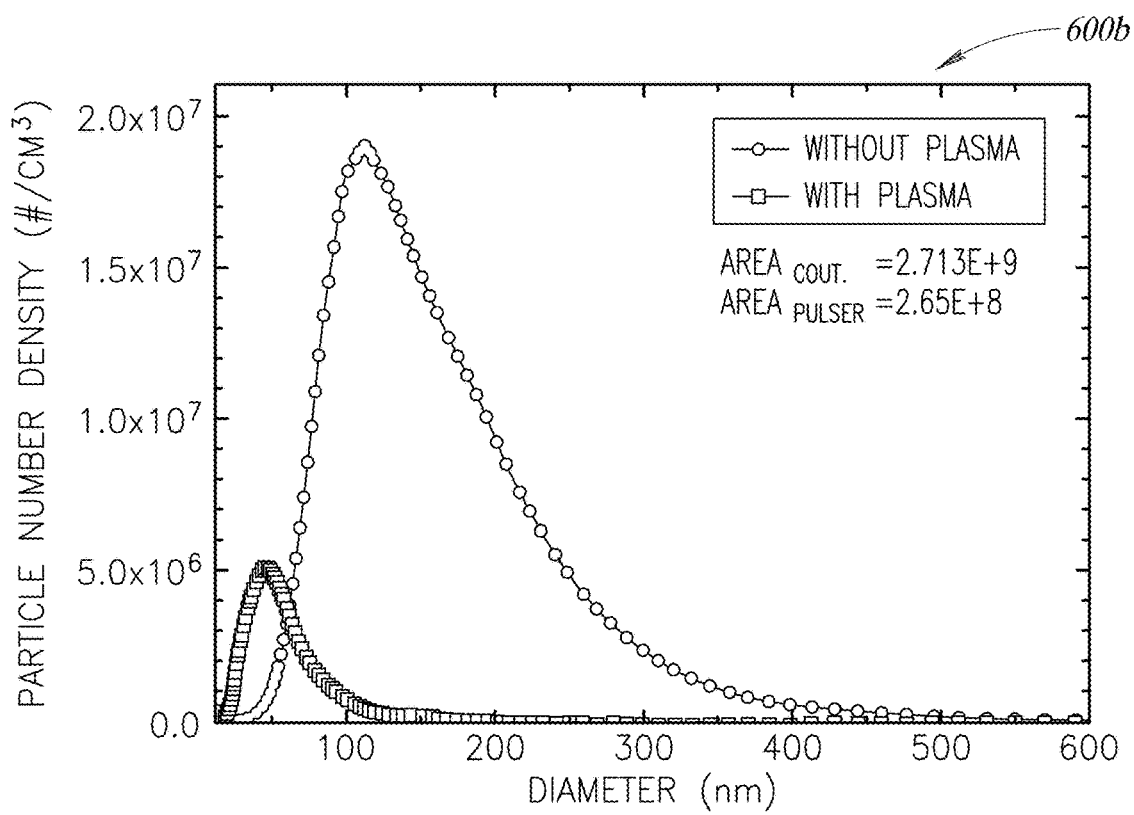
FIG. 6B is a graph that shows plots of a set of particle number densities versus particle size measured (using an SMPS) with and without the plasma treatment for a flow conditions of 0.25 m/s.

FIG. 6A is a graph 600a that shows the particle number densities measured with and without the plasma treatment via the experimental system 500 (FIG. 5) described above at a reactor flow condition of 2.5 m/s. FIG. 6B is a graph 600b that shows the particle number densities measured with and without the plasma treatment via the experimental system 500 (FIG. 5) described above for a reactor flow condition of 0.25 m/s. The integrated peak areas are indicated in FIGS. 6A and 6B. For these datasets, the original untreated particle distributions are peaked around 125-150 nm diameter. With plasma treatment, a significant drop in the particle number was observed along with the emergence of a narrow distribution centered around 30-40 nm. The integrated area of the dominant peak shows a factor of 1.7× reduction in PM number density (i.e., 4.62/2.71=1.7×) at high flow rates (2.5 m/s) and a 10-fold reduction in PM at low flow rates (0.25 m/s).

Figure 7A:
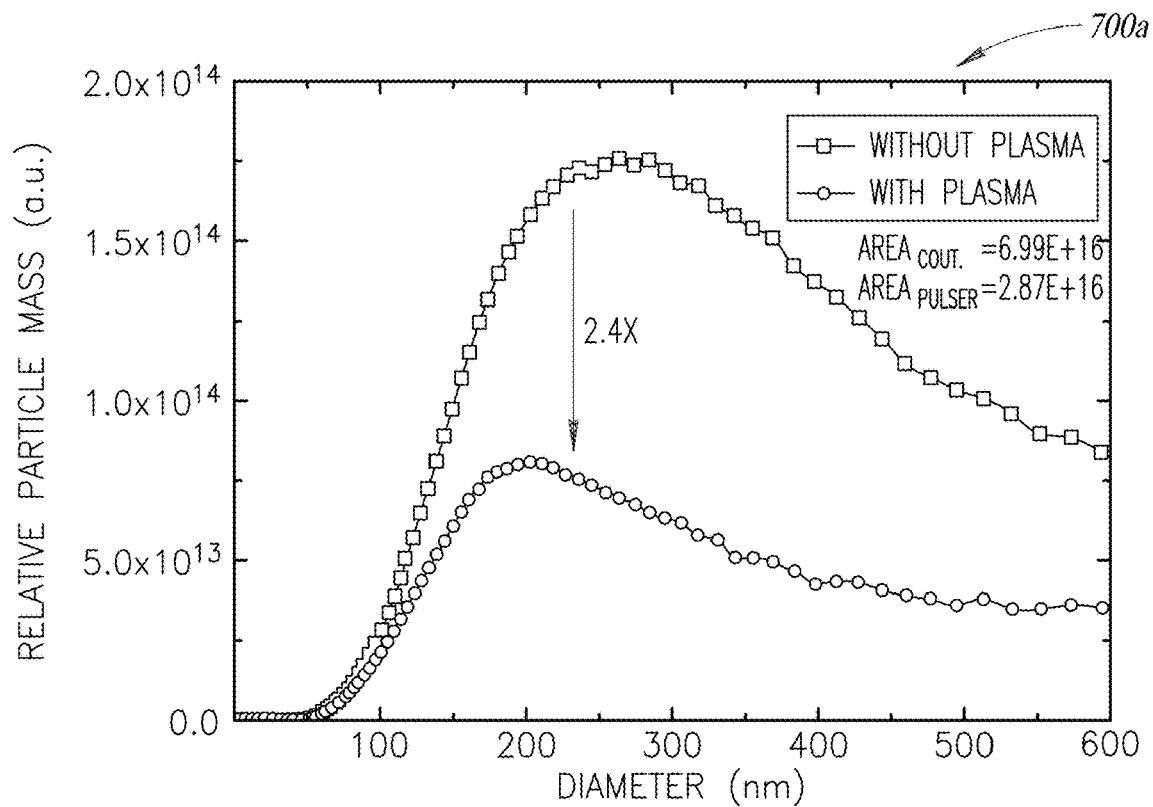
FIG. 7A is a graph that shows plots of a relative particle mass measured versus particle size with and without the plasma treatment for a flow condition of 2.5 m/s.
Figure 7B:
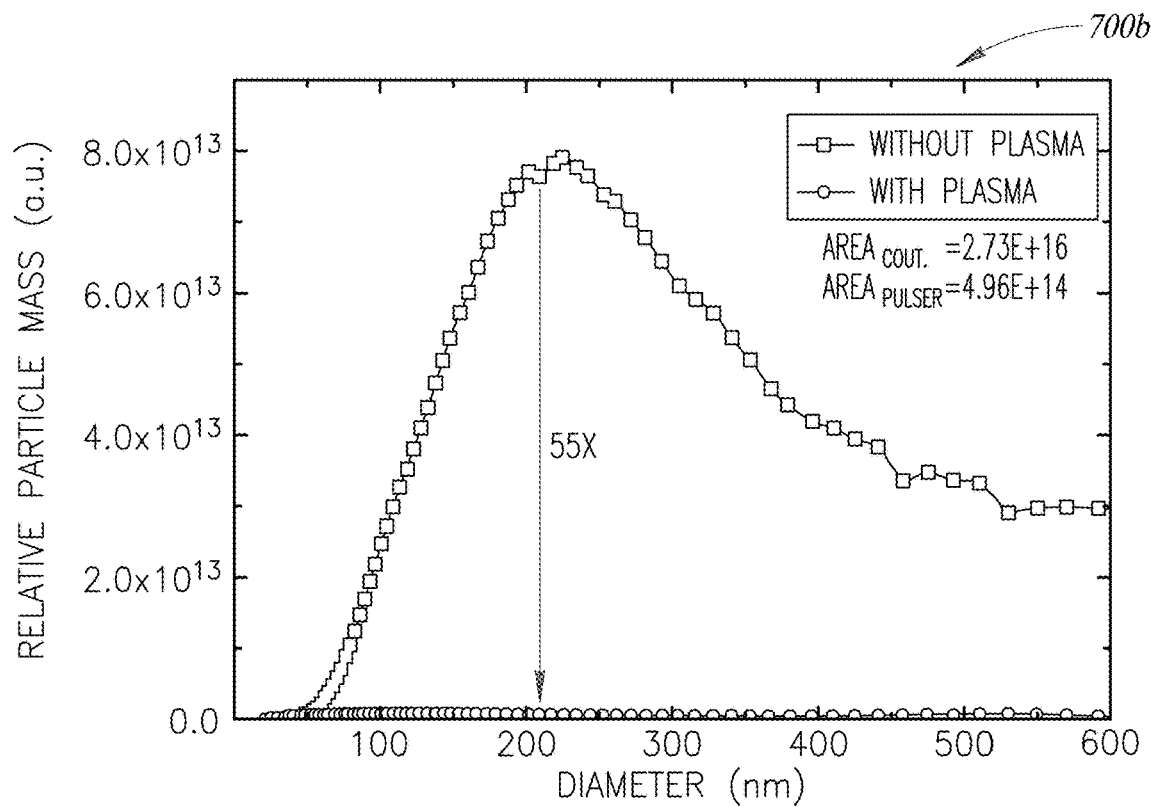
FIG. 7B is a graph that shows plots of a relative particle mass versus particle size measured with and without the plasma treatment for a flow condition of 0.25 m/s.

Since smaller diameter nanoparticles have substantially lower mass than larger diameter nanoparticles, it may be more appropriate to plot the particle mass instead of number density. FIGS. 7A and 7B are graphs 700a, 700b, respectively, that show the "Relative Particle Mass" in arbitrary units obtained by multiplying the number densities in FIGS. 3 and 4, respectively, by the diameter cubed. The integrated peak areas are indicated in FIGS. 7A and 7B. Here, 2.4× and 55×-fold reductions in total PM mass were observed for flow rates of 2.5 and 0.25 m/s, respectively.

Figure 8:
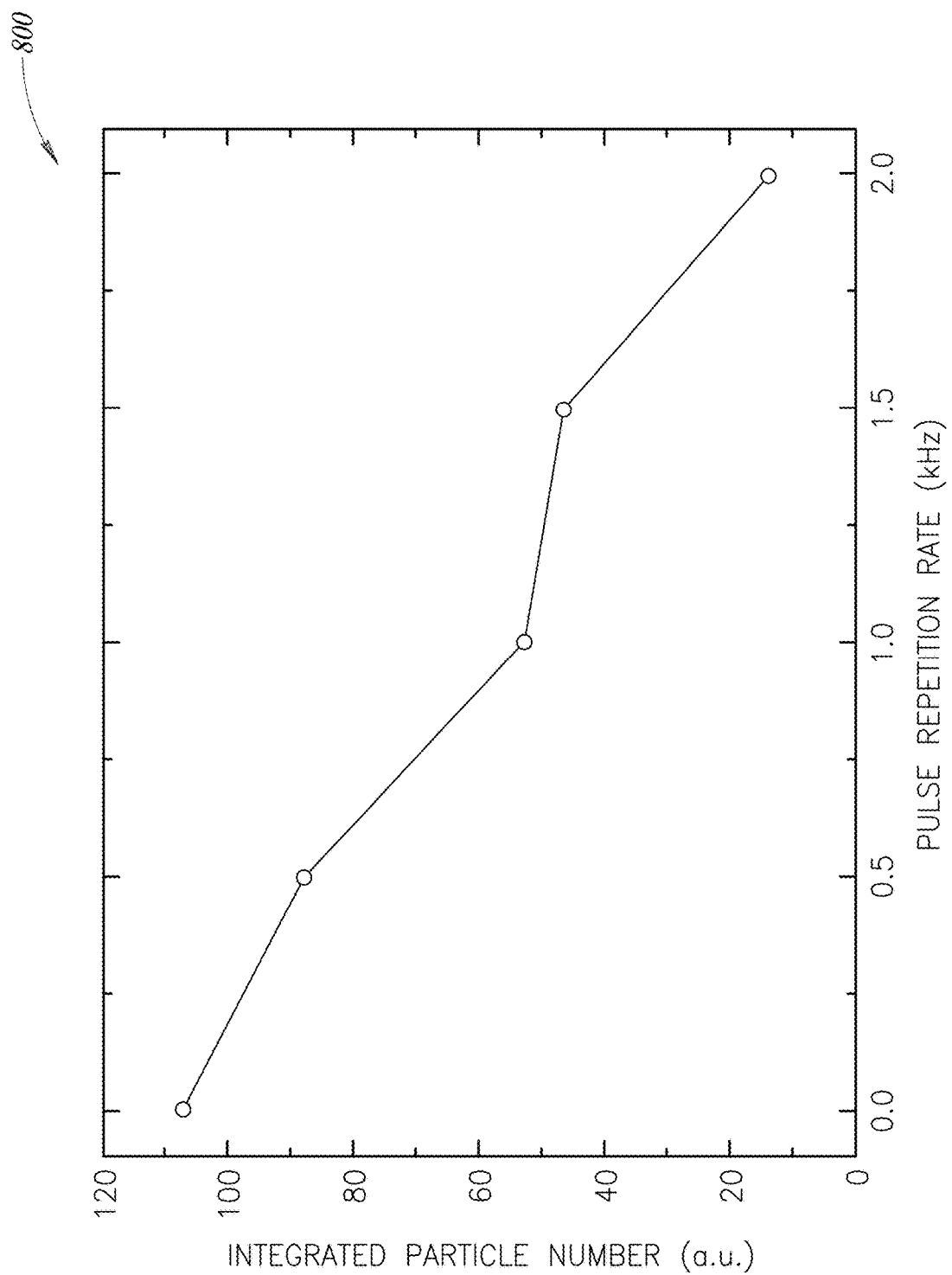
FIG. 8 is a graph that shows an integrated particle numbers (i.e., total particle number) plotted as a function of pulse repetition rate.

The particle distributions were also measured as a function of the pulse repetition rate. FIG. 8 is a graph 800 that shows the integrated particle number plotted as a function of pulse repetition rate, which decreases linearly with increasing repetition rate. Here, the total particle number decreases linearly with increasing repetition rate. These results demonstrate the scalability of this approach for treating higher flow rates and larger systems at higher repetition rates.

Figure 9A:
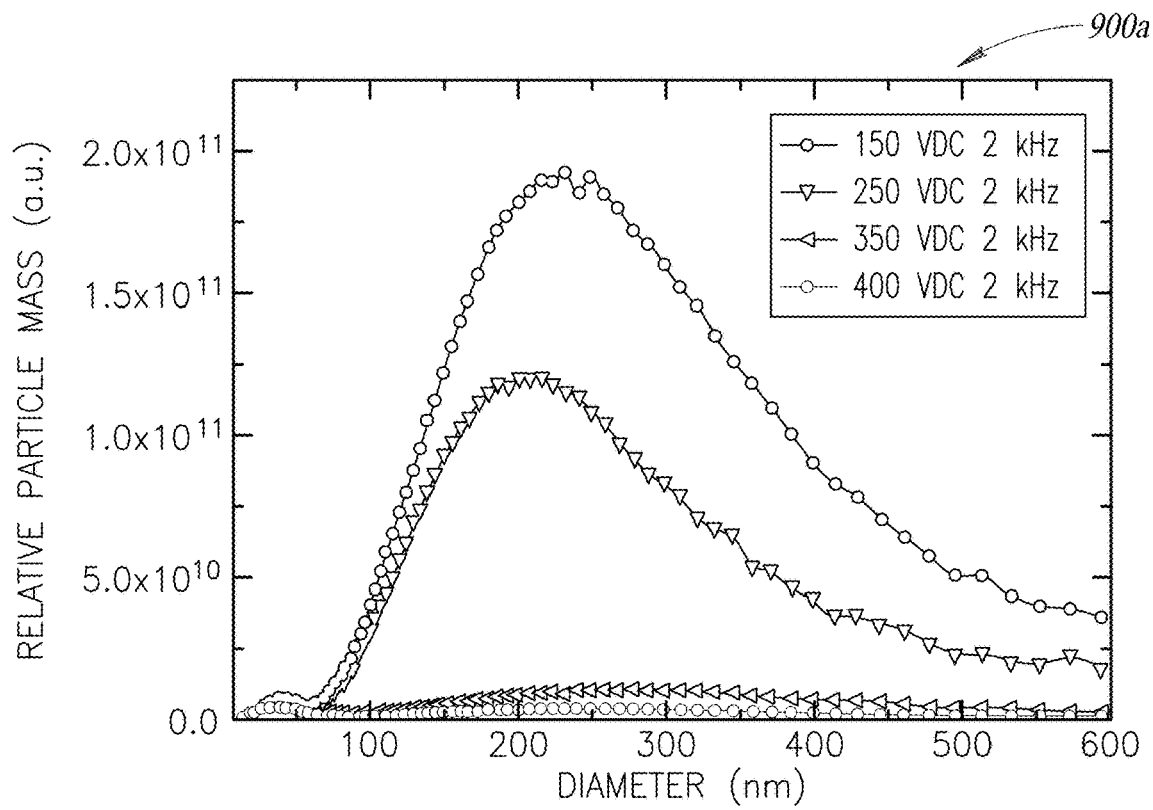
FIG. 9A is a graph that shows a set of plots of a set of particle number densities for various sized particles measured for various respective pulser input voltages.
Figure 9B:
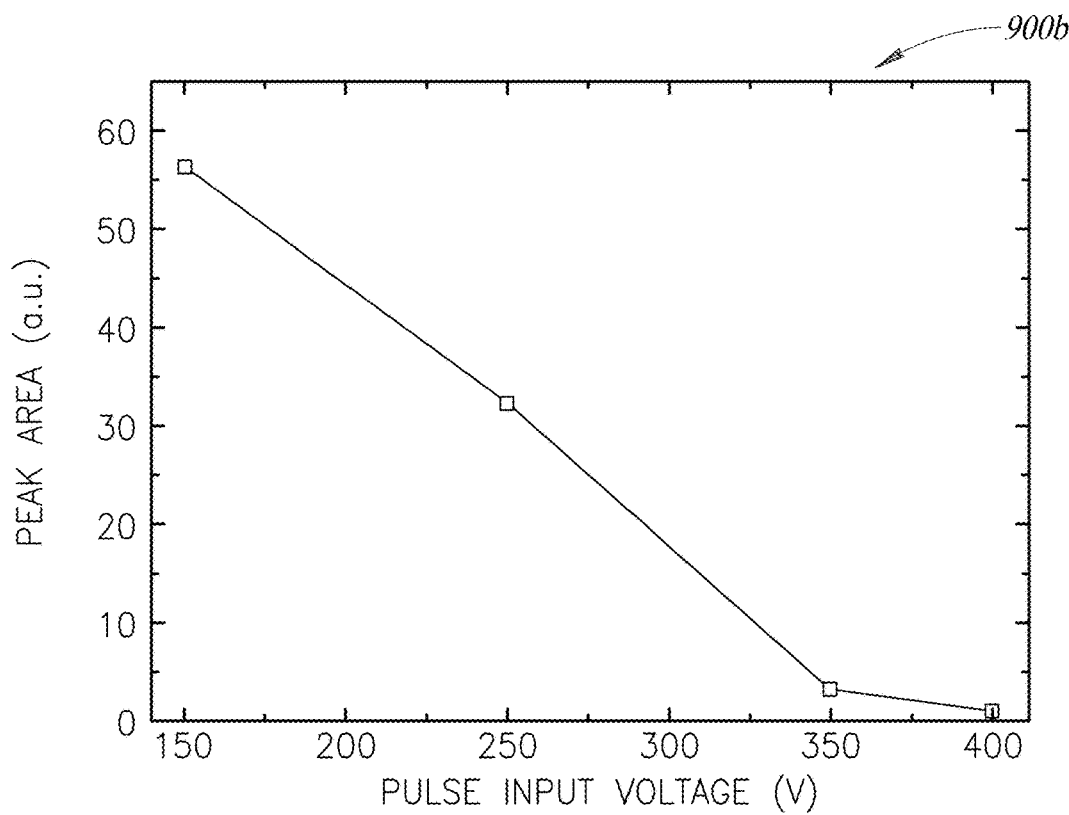
FIG. 9B is a graph that shows a plot of integrated peak areas (i.e., total particle mass) plotted as a function of pulser input voltage.

FIG. 9A is a graph 900a that shows the particle distributions as a function of voltage dependence. FIG. 9B is a graph 900b that shows a plot of integrated peak areas (i.e., total particle mass) plotted as a function of pulser input voltage for the particle distributions of FIG. 9A. Here, again, a monotonic decrease is observed in the integrated area of the PM peak distribution (i.e., total PM mass), with an overall reduction of 40× observed at a pulser input voltage of 400 VDC. These input voltages correspond to pulse energies of approximately 10, 20, 40, and 50 mJ. These results demonstrate the scalability of this approach for treating higher flow rates and larger systems with higher pulse powers.

These measurements demonstrate the effectiveness of transient pulsed plasmas to provide substantial remediation of particulate matter (PM) produced by commercial charbroiling processes (e.g., cooking of hamburger meat). The scalability of this approach for treating higher flow rates and larger systems is also demonstrated as a function of both pulse repetition rate and pulse energy.

This plasma-based approach provides a fundamentally different mechanism for breaking down oil-based particulate matter that cannot be achieved with conventional UV and/or ozone approaches, both of which are present in the plasma. Here, highly reactive chemical radical species, including atomic oxygen, are largely responsible for the effective breakdown of these oil aerosol particles.

One possible advantage of this plasma-based approach lies in the substantially improved flow through the system, which reduces the power requirements associated with the fan or blower. Typically, with filter-based approaches, 2-3 filters are configured in series, resulting in a considerable pressure drop which, in turn, requires high power blowers to be utilized in order to achieve the necessary flow rates for kitchen ventilation compliance. Since there is essential no pressure drop across the plasma-based reactor, significantly lower blower powers can be used to achieve the same flow rates, enabling the overall system (including the nanosecond pulse generator) to consume less power than current filter-based systems.

Other features of the disclosed embodiments will become apparent from the following detailed description, taken in conjunction with the accompanying drawings, which illustrate, by way of example, the principles of the disclosed embodiments.

Another proof-of-principle experiment of the method by which a DC bias is applied together with the nanosecond pulse is shown in FIGS. 10A, 10B, 11, 12A, 12B, 13A and 13B. Here, both polyaromatic olefin PAO-4 and soybean oil particulates created by an oil aerosol generator are treated. As illustrated by the data, a more than three-order-of-magnitude reduction in particulates (i.e., 99.9% remediation) can be achieved with the treatment system described herein. In these tests, the plasma discharge is produced in a 4" diameter cylindrical reactor (illustrated in FIGS. 10A and 10B) with a 5-10 nanosecond high voltage (30 kV) pulse generator together with applied DC bias voltages up to 20 kV. The distribution of nanoparticle sizes is centered around 225 nm in diameter, as measured using a scanning mobility particle sizer (SMPS) spectrometer and follows a log-normal distribution.

Figure 10A:
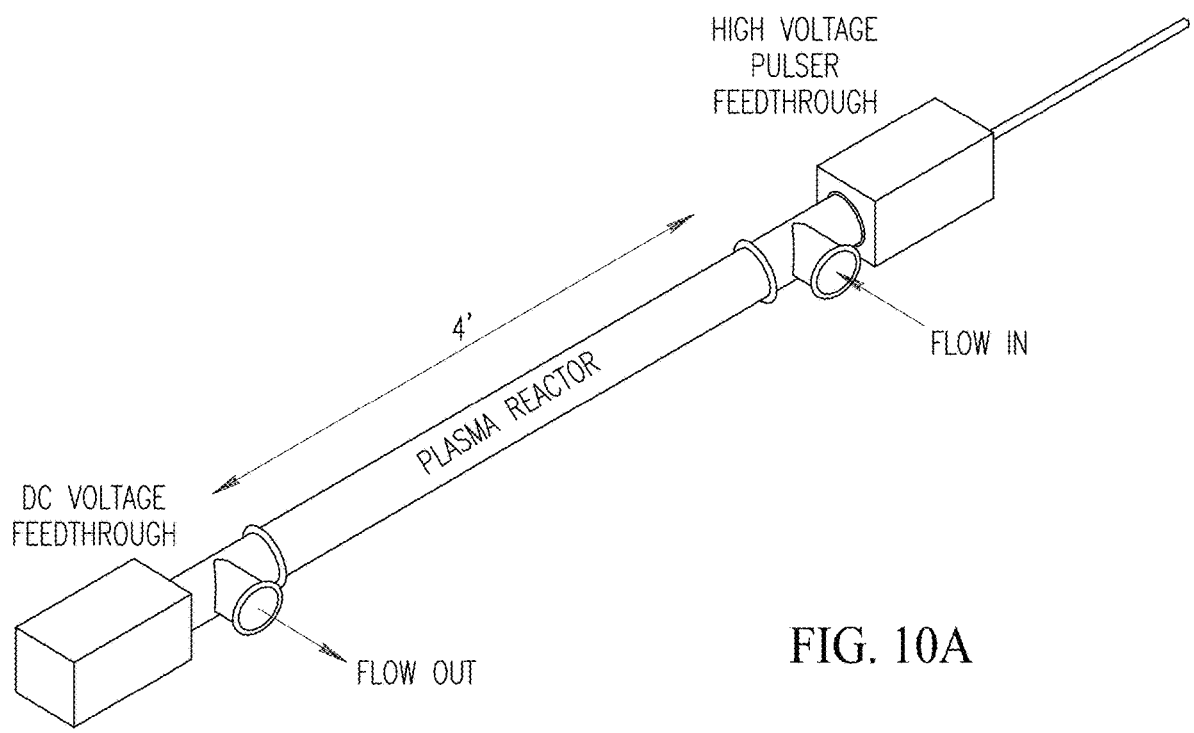
FIG. 10A is an isometric view of a plasma-based reactor for treating restaurant particulate emissions remediation, according to at least one illustrated implementation.
Figure 10B:
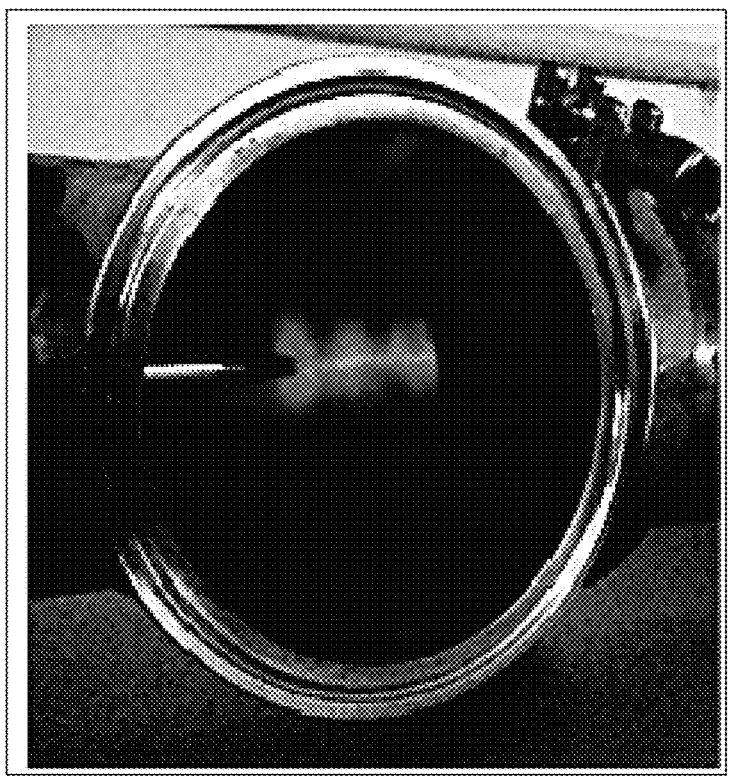
FIG. 10B is a photograph of a plasma discharge at the output port of the reactor system of FIG. 10A.
Figure 11:
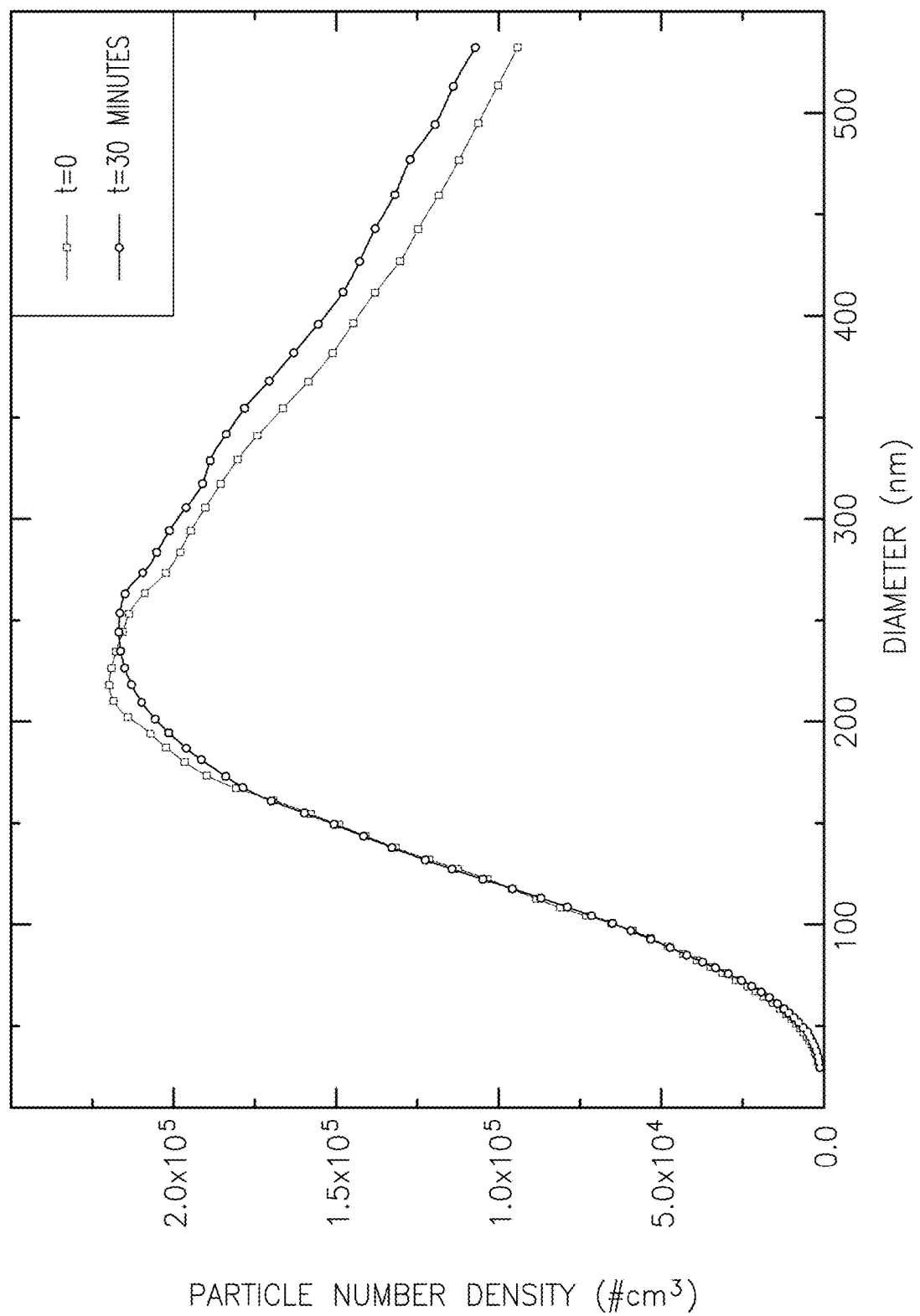
FIG. 11 is a graph showing plots of a particle size distributions produced using POA-4 oil in an aerosol particle generator, with spectra captured 30 minutes apart using a scanning mobility particle sizer (SMPS).

In this experiment, an oil aerosol generator from Aerosol Technologies International (ATI, Inc.) was employed, which creates an oil aerosol by forcing compressed air through a Laskin nozzle. The plasma-based flow reactor used comprises a 4 foot-long, 4 inch-diameter stainless steel cylindrical anode with a 25 mil single-wire cathode arranged in a coaxial geometry, as illustrated in FIGS. 10A and 10B. This plasma-based flow system has electrical feedthroughs on either end of the reactor, one for supplying high DC voltages and the other for high voltage nanosecond pulses, as indicated in FIG. 10A. AC and DC filters have been built into these feedthroughs in order to protect the nanosecond pulse generator from the high voltage DC bias and vice versa. The plasma is produced using a TPS Model 30X pulse generator operating at a peak voltage of 30 kV, a pulse repetition rate of 200 Hz, and a continuous power of 30 W. Here, the generation of plasma is assisted by 20 kV DC power supply capable of supplying up to 30 W of continuous power. Baseline particle distributions (i.e., histograms) were measured using a scanning mobility particle sizer (SMPS) without a plasma or DC bias and exhibit highly stable distributions, as show in FIG. 11.

Figure 12A:
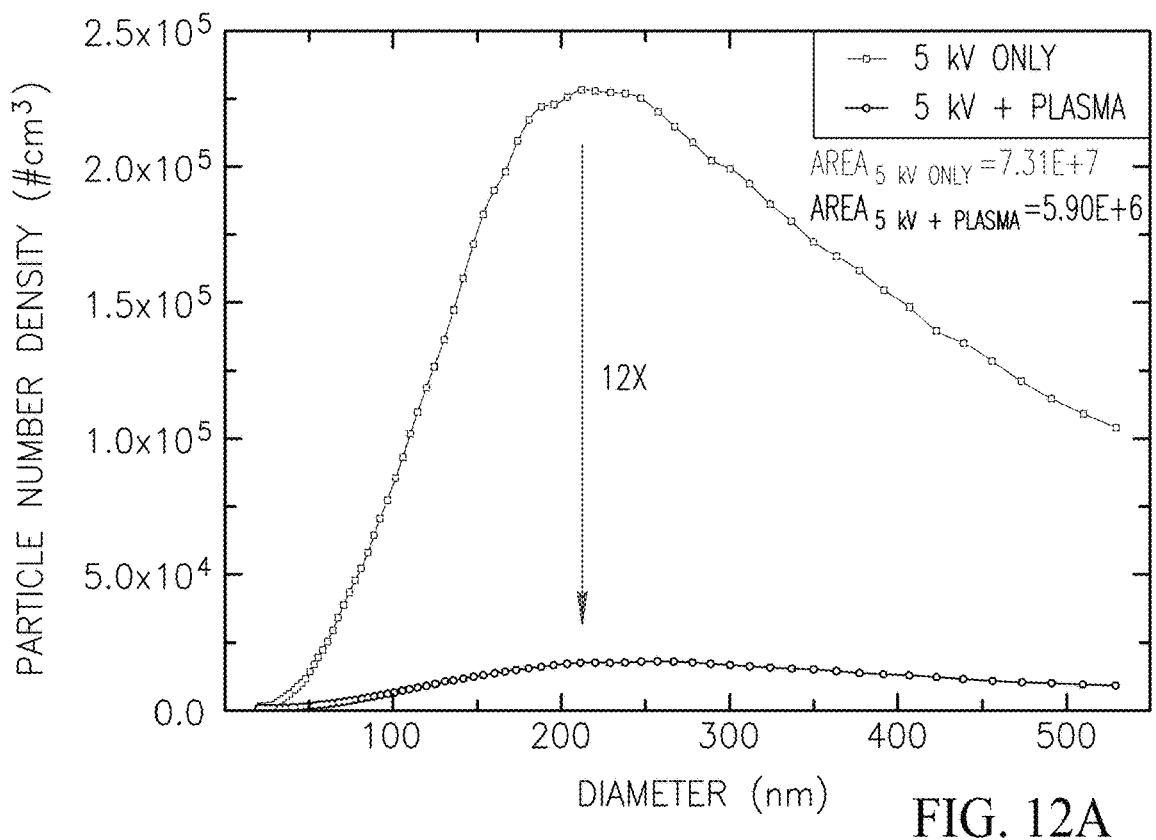
FIG. 12A is a graph showing a plot of a particle size distribution obtained with PAO-4 under an applied DC voltage of 5 kV, both with and without a 30 kV nanosecond pulsed plasma (pulse repetition rate of 200 Hz and electrically continuous power of 30 W).
Figure 12B:
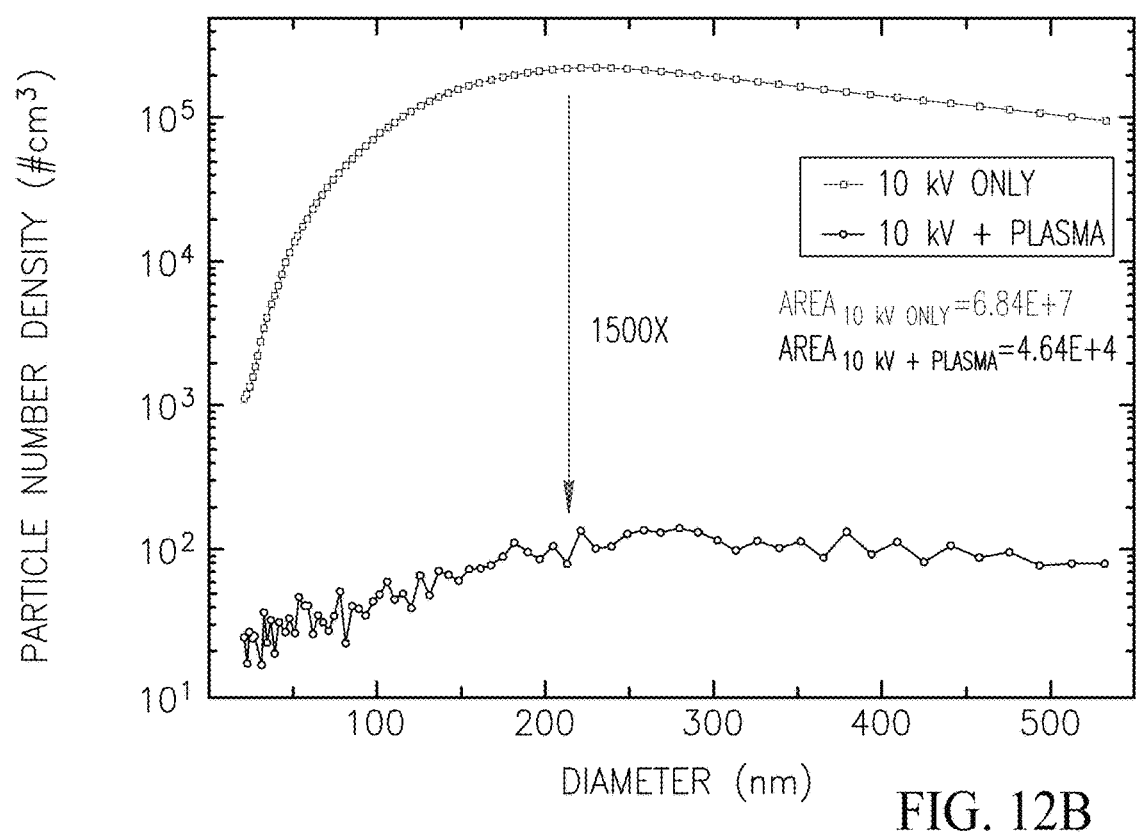
FIG. 12B is a graph showing a plot of a particle size distribution obtained with PAO-4 under an applied DC voltage 10 kV, both with and without a 30 kV nanosecond pulsed plasma (pulse repetition rate of 200 Hz and electrically continuous power of 30 W).

FIG. 12A shows particle size distributions taken under an applied DC voltage of 5 kV both with and without the nanosecond pulse generator running at a peak voltage of 30 kV, pulse repetition rate of 200 Hz, and continuous electrical power of 30 W. A comparison of these two distributions shows a more than 12-fold reduction of total PM concentration (i.e., 92% remediation). Here, the integrated areas are indicated in the plot corresponding to the total particle concentrations both with and without the transient pulsed plasma. Similarly, FIG. 12B shows particle size distributions taken with an applied DC voltage of 10 kV both with and without a nanosecond pulse generator, exhibiting a more than 1500-fold reduction in PM concentration (i.e., 99.9% remediation). It should be noted that the particle distributions taken with 5 kVDC and 10 kVDC only, without the nanosecond pulse generator, are nearly identical to the untreated baseline data (i.e., no remediation) plotted in FIG. 11.

Figure 13A:
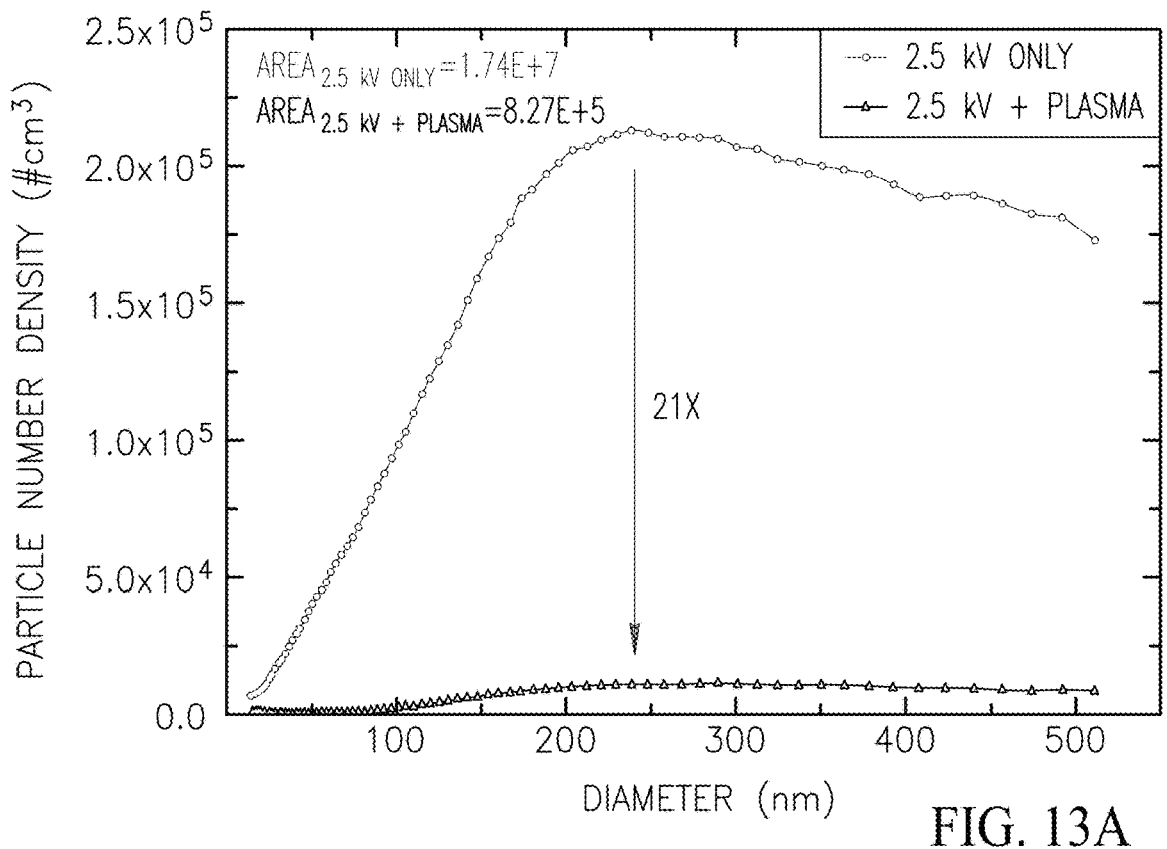
FIG. 13A is a graph showing a particle size distribution obtained with soybean oil under an applied DC voltage of 2.5 kV, both with and without the nanosecond pulsed plasma running at a peak voltage of 30 kV, pulse repetition rate of 200 Hz, and continuous power of 30 W.
Figure 13B:
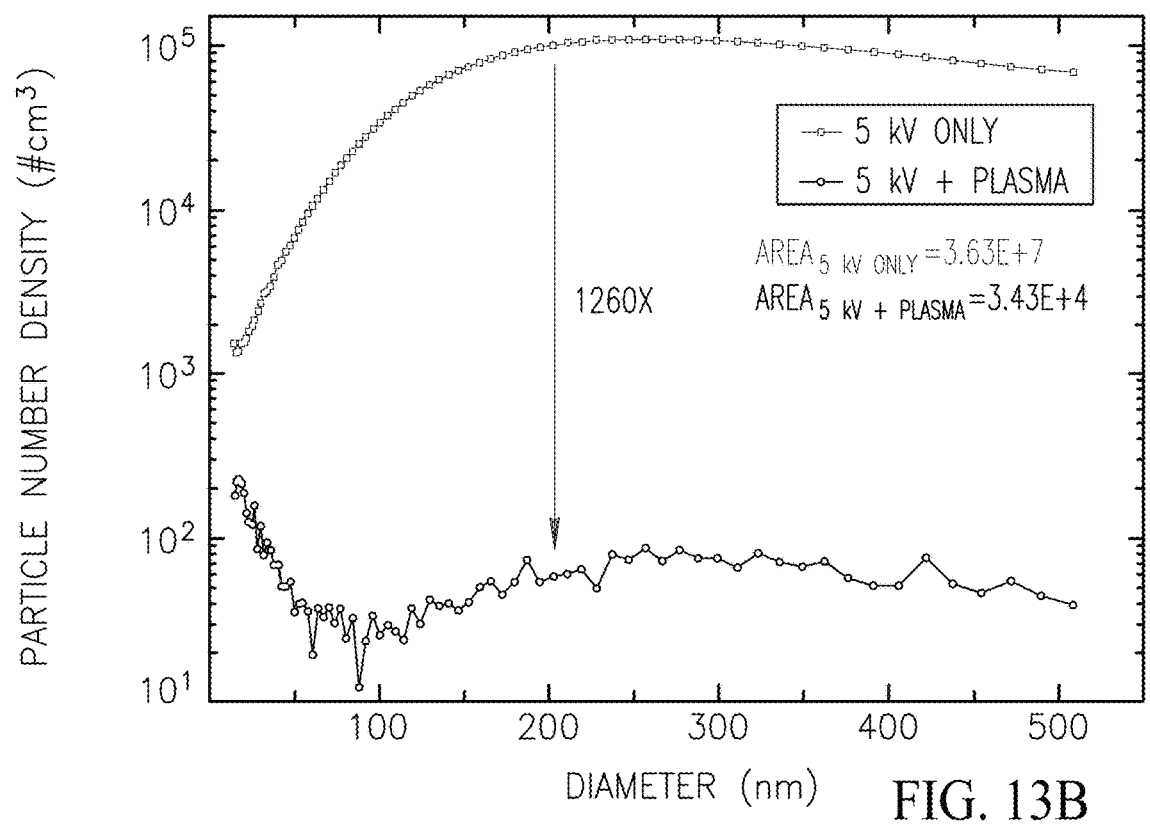
FIG. 13B is a graph showing a particle size distribution obtained with soybean oil under an applied DC voltage of 5 kV, both with and without the nanosecond pulsed plasma running at a peak voltage of 30 kV, pulse repetition rate of 200 Hz, and continuous power of 30 W.

A separate set of measurements was taken using soybean oil rather than PAO-4. The soybean oil more closely resembles the oil-based nanoparticles that are generated by the charbroiling of hamburger meat and is often used as a surrogate grease generator following the UL 1046 standard method. However, it is also worth noting that these soybean oil grease aerosol particles are generated at room temperature and do not contain any carbonaceous particles, such as those produced in the combustion of natural gas. FIG. 13A shows particle size distributions taken with an applied DC voltage of 2.5 kV both with and without the nanosecond pulsed plasma. FIG. 13B shows particle size distributions taken with an applied DC voltage of 5 kV both with and without the nanosecond pulsed plasma. For a DC bias of 2.5 kV, a 21-fold reduction in PM concentration (i.e., 96% remediation) was observed. For a DC bias of 5 kVDC, a more than 1260-fold reduction in PM concentration (i.e., 99.9% remediation) was observed. Without being bound by theory, the improved remediation obtained with a DC bias of 5 kV compared to that of 2.5 kVDC can be attributed to the increased electric fields that are achieved when adding the 30 kV peak pulse voltage. At higher DC biases, the plasma density is higher and fills a more substantial volume of the reactor. It should, again, be noted that the distributions observed with 2.5 and 5 kVDC bias only (i.e., without the nanosecond pulse generator) are nearly identical to the untreated data (i.e., no remediation).

Various embodiments of the devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any nontransitory computer-readable medium for use by or in connection with any computer and/or processor related system or method. In the context of this document, a memory is a computer-readable medium that is an electronic, magnetic, optical, or other another physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer-readable medium" can be any means that can store, communicate, propagate, or transport the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. U.S. patent application Ser. No. 62/699,475; U.S. Pat. No. 8,115,343; International patent application No. PCT/US2019/014339; International patent application No. PCT/US2019/014273; U.S. Pat. No. 9,617,965, are each incorporated herein by reference, in their entirety.

From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A method to treat exhaust streams, the method comprising:
    capturing an exhaust stream;
    passing the captured exhaust stream through a transient plasma emission remediation (TPER) reactor; and
    driving the TPER reactor with a high voltage pulse with a duration of nanoseconds to generate a non-equilibrated transient plasma in a portion of the TPER reactor through which the captured exhaust stream passes.

2. The method of claim 1 wherein capturing an exhaust stream includes capturing the exhaust stream via a hood positioned over a cooking appliance and capturing smoke generated by cooking of food by a cooking appliance.

3. The method of claim 2 wherein capturing smoke generated by cooking of food by a cooking appliance includes capturing smoke generated by charbroiling of meat by a charbroiler.

4. The method of claim 1 wherein driving the TPER reactor with a high voltage pulse with a duration of nanoseconds includes applying a fast rising, high voltage pulse with a duration of nanoseconds to at least one electrode of the TPER reactor.

5. The method of claim 1 wherein passing the captured exhaust stream through a TPER reactor includes passing the captured exhaust stream through a TPER reactor that is coupled serially in a fluid flow path between a hood and an exhaust outlet vent.

6. The method of claim 1 wherein passing the captured exhaust stream through a TPER reactor includes operating at least one blower that is coupled to a fluid flow path to move the captured exhaust stream from a hood toward an exhaust outlet vent.

7. The method of claim 1, further comprising:
applying a DC bias voltage by a DC voltage source to an energized conductor of the TPER reactor.

8. The method of claim 7 wherein driving the TPER reactor with a high voltage pulse with a duration of nanoseconds includes applying an electric field of the high voltage, pulse with a nanosecond duration pulse on top of a static electric field produced by the DC bias voltage.

9. The method of claim 7 wherein applying a DC bias voltage by a DC voltage source to an energized conductor of the TPER reactor includes applying a DC bias that produces a static electric field that does not produce an electrical discharge.

10. The method of claim 7 wherein applying a DC bias voltage by a DC voltage source to an energized conductor of the TPER reactor includes applying a DC bias that lowers a field generated by the high voltage, nanosecond duration pulse.

11. The method of claim 7 wherein applying a DC bias voltage by a DC voltage source to an energized conductor of the TPER reactor includes applying a DC bias voltage that produces a static electric field that precipitates particulate matter out of the gas flow.

12. A system to treat exhaust streams, the system comprising: at least one transient plasma emission remediation (TPER) reactor, the at least one TPER reactor including an electrically conductive tube that forms a first electrode and at l least a second electrode positioned in an interior of the electrically conductive tube, the electrically conductive tube sized to be serially coupled in a flow path formed by one or more ducts; and at least one nanosecond pulse generator coupled to drive the at least one TPER reactor.

13. The system of claim 12, further comprising:
a hood positioned with respect to at least one cooking appliance to capture a cooking exhaust stream.

14. The system of claim 13 wherein the cooking appliance is a charbroiler, the cooking exhaust stream includes smoke created by cooking of meat by the charbroiler, and the hood is positioned above the charbroiler to capture at least the smoke created by cooking of meat by the charbroiler.

15. The system of claim 14, further comprising:
one or more ducts that provide a fluid path been the hood and an exhaust outlet vent, wherein the at least one TPER reactor is positioned in the fluid path between the hood and the exhaust outlet vent.

16. The system of claim 13, further comprising:
one or more blowers fluidly coupled to move the captured cooking exhaust stream from the hood toward the exhaust outlet.

17. The system of claim 12 wherein the at least one TPER reactor is coaxial, comprising an electrically conductive tube and a center conductor that is centered inside of the electrically conductive tube.

18. The system of claim 12 wherein the electrically conductive tube has an inner diameter that is between 1 inch inclusive and 24 inches inclusive and the center conductor has a diameter that is between 0.001 inch inclusive and 1.0 inch inclusive.

19. The system of claim 12 wherein the at least one TPER has a length of between 12 inches and 500 inches.

20. The system of claim 12 wherein the at least one nanosecond pulse generator coupled to drive the at least one TPER reactor is operable to supply a fast rising, high voltage pulse with a duration of nanoseconds to produce a non-equilibrated transient plasma inside at least a portion of the at least one TPER reactor.

21. The system of claim 12 wherein the system comprises a retro-fit system sized and dimensioned to be fluidly communicatively coupled with one or more pre-existing exhaust ducts.

22. The system of claim 12, further comprising:
a DC high voltage source electrically coupled to apply a DC bias voltage to at least one conductor of the at least one TPER reactor.

23. The system of claim 22, further comprising:
a coupling capacitor through which a high voltage, nanosecond duration pulse is coupled onto the at least one conductor to which the DC bias voltage is applied.

24. The system of claim 22, further comprising:
a low pass filter that isolates the DC high voltage source from the at least one nanosecond pulse generator that generates high voltage, nanosecond duration.

25. The method of claim 1, further comprising:
coupling the high voltage, nanosecond duration pulse onto a DC biased conductor of the TPER reactor through a coupling capacitor, and isolating the DC voltage source from a source of the high voltage, nanosecond duration pulse by a low pass filter.

* * * * *